(12) United States Patent
Nomura et al.

(10) Patent No.: US 8,927,671 B2
(45) Date of Patent: Jan. 6, 2015

(54) ETHYLENE-α-OLEFIN COPOLYMER

(71) Applicant: Sumitomo Chemical Company, Limited, Chuo-ku, Tokyo (JP)

(72) Inventors: Jumma Nomura, Ichihara (JP); Masato Takano, Ichihara (JP); Yoshinobu Nozue, Tokyo (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/041,310

(22) Filed: Sep. 30, 2013

(65) Prior Publication Data
US 2014/0094582 A1 Apr. 3, 2014

(30) Foreign Application Priority Data
Oct. 2, 2012 (JP) ................................. 2012-220090

(51) Int. Cl.
*C08F 210/16* (2006.01)

(52) U.S. Cl.
CPC .................................... *C08F 210/16* (2013.01)
USPC ..................... 526/348.5; 526/348; 526/348.2; 526/348.4; 526/348.6; 526/119

(58) Field of Classification Search
USPC .............. 526/348, 348.2, 348.4, 348.5, 348.6
See application file for complete search history.

(56) References Cited

U.S. PATENT DOCUMENTS

| | | |
|---|---|---|
| 2008/0090983 A1 | 4/2008 | Satoh et al. |
| 2009/0137755 A1 | 5/2009 | Yamada et al. |
| 2010/0305292 A1 | 12/2010 | Nozue et al. |
| 2010/0310799 A1 | 12/2010 | Nozue et al. |
| 2011/0040059 A1* | 2/2011 | Nozue et al. ................... 526/348 |
| 2012/0065352 A1 | 3/2012 | Nozue et al. |
| 2013/0005930 A1 | 1/2013 | Nozue et al. |
| 2013/0053465 A1* | 2/2013 | Manami et al. ............... 521/144 |

* cited by examiner

*Primary Examiner* — Roberto Rabago
(74) *Attorney, Agent, or Firm* — Panitch Schwarze Belisario & Nadel LLP

(57) ABSTRACT

The present invention relates to an ethylene-α-olefin copolymer satisfying the following requirements (A) to (E):
 (A) the MFR is 0.1 to 50 g/10 min.,
 (B) the density is 860 to 970 kg/m$^3$,
 (C) the Mz/Mw is from 3.0 to 6.0,
 (D) the fraction having a molecular weight of $10^{6.5}$ g/mol of the ethylene-α-olefin copolymer has a branching index g' of 0.26 or more, and
 (E) the Ea is 60 to 90 kJ/mol.

5 Claims, 1 Drawing Sheet

US 8,927,671 B2

ETHYLENE-α-OLEFIN COPOLYMER

TECHNICAL FIELD

The present invention relates to an ethylene-α-olefin copolymer, a resin composition comprising the ethylene-α-olefin copolymer, and an article made of the resin composition.

BACKGROUND ART

Ethylene-based polymers are molded by various molding methods and are used for various applications. Patent Document 1 discloses as an ethylene-based polymer superior in moldability and in mechanical strength an ethylene-α-olefin copolymer obtained by using a metallocene catalyst comprising a combination of a transition metal compound having a ligand in which two groups each having a cyclopentadiene type anion skeleton are linked via a bridging group and a transition metal compound having a ligand in which a group having a cyclopentadiene type anion skeleton and a group having a fluorenyl type anion skeleton are linked via a bridging group.

PRIOR ART DOCUMENT

Patent Document

SUMMARY OF THE INVENTION

Problems to be Solved by the Invention

However, when the above-mentioned ethylene-α-olefin copolymer is formed with a flat die to produce a film, it is not fully satisfactory in balance between neck-in and drawability. An articles made from the ethylene-α-olefin copolymer are not fully satisfactory in appearance. Under such circumstances, the problem to be solved by the present invention is to provide an ethylene-α-olefin copolymer which is superior in balance between neck-in and drawability and from which formed articles superior in appearance can be produced.

Means for Solving the Problems

The present invention relates to an ethylene-α-olefin copolymer comprising monomer units derived from ethylene and monomer units derived from an α-olefin having 3 to 20 carbon atoms, the ethylene-α-olefin copolymer satisfying the following requirements (A) to (E):

(A) the melt flow rate is 0.1 to 50 g/10 min., wherein the melt flow rate is determined at a temperature of 190° C. and a load of 21.18 N in accordance with Method A provided in JIS K7210-1995, (B) the density is 860 to 970 kg/m$^3$, (C) the ratio of the z-average molecular weight to the weight-average molecular weight is from 3.0 to 6.0, (D) the fraction having a molecular weight of $10^{6.5}$ g/mol of the ethylene-α-olefin copolymer has a branching index g' of 0.26 or more, wherein the molecular weight is determined by 3D-GPC, and (E) the activation energy of flow is 60 to 90 kJ/mol.

Effect of the Invention

According to the present invention, an ethylene-α-olefin copolymer can be provided which is superior in balance between neck-in and drawability and from which articles superior in appearance can be produced.

MODE FOR CARRYING OUT THE INVENTION

Figure 1:
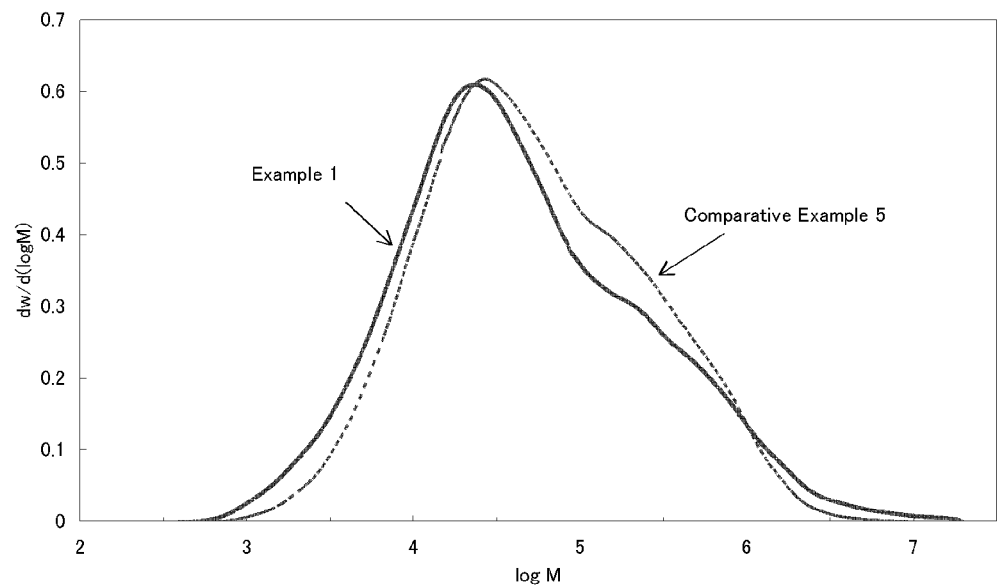
FIG. 1 is a diagram showing the molecular weight distribution of an ethylene-α-olefin copolymer.

In the following, the present invention is described in detail.

The ethylene-α-olefin copolymer of the present invention is a copolymer that has monomer units derived from ethylene and monomer units derived from an α-olefin having from 3 to 20 carbon atoms. Examples of the α-olefin having from 3 to 20 carbon atoms include propylene, 1-butene, 4-methyl-1-pentene, 1-hexene, 1-octene, and 1-decene. More preferred is 1-butene or 1-hexene. The ethylene-α-olefin copolymer may include monomer units derived from two or more α-olefins having 3 to 20 carbon atoms.

The content of the monomer units derived from ethylene in the ethylene-α-olefin copolymer of the present invention is usually 50% by weight or more where the overall weight of the ethylene-α-olefin copolymer is taken as 100% by weight. The content of the monomer units derived from an α-olefin having 3 to 20 carbon atoms is usually 50% by weight or less where the overall weight of the ethylene-α-olefin copolymer is taken as 100% by weight.

The ethylene-α-olefin copolymer of the present invention may have monomer units derived from a monomer other than ethylene and α-olefins having 3 to 20 carbon atoms in addition to the monomer units derived from ethylene and the monomer units derived from an α-olefin having 3 to 20 carbon atoms as long as the effect of the present invention is not impaired. Examples of such a monomer include conjugated dienes, such as 1,3-butadiene and 2-methyl-1,3-butadiene; nonconjugated dienes, such as 1,4-pentadiene and 1,5-hexadiene; unsaturated carboxylic acids, such as acrylic acid and methacrylic acid; unsaturated carboxylic acid esters, such as methyl acrylate, ethyl acrylate, butyl acrylate, methyl methacrylate, and ethyl methacrylate; and vinyl ester compounds, such as vinyl acetate.

Examples of the ethylene-α-olefin copolymer of the present invention include ethylene homopolymers, ethylene-propylene copolymers, ethylene-1-butene copolymers, ethylene-1-hexene copolymers, ethylene-4-methyl-1-pentene copolymers, ethylene-1-octene copolymers, ethylene-1-butene-1-hexene copolymers, ethylene-1-butene-4-methyl-1-pentene copolymers, and ethylene-1-butene-1-octene copolymers. Preferred are ethylene-1-butene copolymers, ethylene-1-hexene copolymers, ethylene-1-octene copolymers, ethylene-1-butene-1-hexene copolymers, and ethylene-1-butene-1-octene copolymers; ethylene-1-hexene copolymers are more preferred.

The melt flow rate (MFR) of the ethylene-α-olefin copolymer of the present invention is 0.1 to 50 g/10 min. In order to obtain an article with good mechanical strength, the MFR is preferably 20 g/10 min or less, more preferably 10 g/10 min or less, and even more preferably 7 g/10 min or less. From the viewpoint of processability, the MFR is preferably 0.5 g/10 min or more, more preferably 1.0 g/10 min or more, and even more preferably 2.0 g/10 min or more. The MFR is measured under conditions represented by a temperature of 190° C. and a load of 21.18 N in accordance with Method A provided in JIS K7210-1995. The MFR can be adjusted by, for example, the hydrogen concentration or the molar ratio of the transition metal complex (A) to the transition metal complex (B) ([A]/[B]) in the below-described method for producing the copolymer. If the hydrogen concentration is made higher or the molar ratio of [A]/[B] is made higher, a copolymer having a higher MFR will be obtained.

The density of the ethylene-α-olefin copolymer of the present invention is 860 to 970 kg/m$^3$. From the viewpoint of increasing the mechanical strength, the density is preferably not more than 940 kg/m$^3$, more preferably not more than 930 kg/m$^3$. From the viewpoint of increasing the rigidity, the density is preferably not less than 890 kg/m$^3$, more preferably not less than 900 kg/m$^3$, even more preferably not less than 910 kg/m$^3$, and still even more preferably not less than 912 kg/m$^3$. The density is measured in accordance with Method A provided in JIS K7112-1980 using a sample subjected to the annealing disclosed in JIS K6760-1995. The density can be controlled, for example, depending upon the partial pressure of ethylene or the amount of the α-olefin having 3 to 20 carbon atoms in the below-described method for producing the copolymer. If the partial pressure of ethylene is made higher or the amount of the α-olefin having 3 to 20 carbon atoms is reduced, a copolymer with a higher density will be obtained.

The swell ratio of the ethylene-α-olefin copolymer of the present invention is preferably 2.4 to 4.0. From the viewpoint of melt tension exhibited at the time of melting and forming the ethylene-α-olefin copolymer of the present invention or the viewpoint of making fine the foamed cells in the foam obtained when using the copolymer for foaming, the swell ratio is preferably not less than 2.45, more preferably not less than 2.50. From the viewpoint of improving drawability exhibited at the time of melting and forming the copolymer, the swell ratio is preferably not more than 3.00. The swell ratio can be adjusted by, for example, the hydrogen concentration or the molar ratio of the transition metal complex (A) to the transition metal complex (B) in the below-described method for producing of the copolymer. The swell ratio is calculated via the following method. The diameter D (unit: mm) of the strand of the ethylene-α-olefin copolymer obtained in the above-described melt flow rate measurement was measured, and then the value (D/D$_0$) calculated by dividing the diameter D by the diameter of the orifice, i.e. 2.095 mm (D$_0$), was defined as the swell ratio.

The ratio (Mz/Mw) of the polystyrene-equivalent z-average molecular weight (Mz) to the polystyrene-equivalent weight-average molecular weight (Mw) of the ethylene-α-olefin copolymer of the present invention is from 3.0 to 6.0. In order to obtain an article with high mechanical strength or good appearance, the Mz/Mw of the ethylene-α-olefin copolymer is preferably not more than 5.5, more preferably not more than 4.5, and even more preferably not more than 4.0. From the viewpoint of processability, the Mz/Mw is preferably not less than 3.3, and more preferably not less than 3.5.

The ratio (Mw/Mn) of the Mw to the polystyrene-equivalent number average molecular weight (Mn) of the ethylene-α-olefin copolymer of the present invention is preferably from 4.0 to 10.0. In order to obtain a formed article having high mechanical strength, the Mw/Mn is preferably not more than 7.0, more preferably not more than 6.5. From the viewpoint of processability, the Mw/Mn is preferably not less than 5.0, and more preferably not less than 5.5.

Mz/Mw and Mw/Mn can be controlled by adjusting polymerization conditions. For example, the molar ratio of a transition metal complex (A) to a transition metal complex (B) ([A]/[B]) and the polymerization temperature may be varied. Mz/Mw and Mw/Mn can be controlled also by adjusting the difference between the hydrogen concentration in the system at the beginning of the polymerization and the hydrogen concentration in the system at the completion of the polymerization by adjusting the hydrogen concentration in the feed gas.

The Mn, the Mw, and the Mz of the ethylene-α-olefin copolymer of the present invention are measured by gel permeation chromatography (GPC) under the following conditions.

Instrument: Waters150C manufactured by Waters Corporation
Separation column: TOSOH TSKgel GMH-HT
Measurement temperature: 140° C.
Carrier: orthodichlorobenzene
Flow rate: 1.0 mL/min
Injection amount: 500 µL.

The activation energy of flow (Ea) of the ethylene-α-olefin copolymer of the present invention is 60 to 90 kJ/mol. From the viewpoint of reducing an extrusion load in processing, the Ea is preferably 65 kJ/mol or more, more preferably 70 kJ/mol or more. From the viewpoint of improving the drawability in extruding, the Ea is preferably 85 kJ/mol or less, more preferably 80 kJ/mol or less. The Ea mainly depends upon the number of long chain branches in a copolymer. Copolymers containing many long chain branches are high in Ea. In the production of a copolymer, a copolymer containing many long chain branches is obtained by performing polymerization at a low hydrogen concentration or adjusting the molar ratio of a transition metal complex (A) to a transition metal complex (B) ([A]/[B]) to be high.

Activation energy (Ea) of flow is a numerical value calculated by Arrhenius type equation from the shift factor (a$_T$) in preparing a master curve showing the dependency of melt complex viscosity (unit: Pa·sec) on angular frequency (unit: rad/sec) at 190° C. on the basis of temperature-time superposition principle, and is a value obtained by the method as described below. First, melt complex viscosity-angular frequency curves of an ethylene-α-olefin copolymer at four temperatures (T, unit: ° C.) including 190° C. selected from among 130° C., 150° C., 170° C., 190° C. and 210° C. are produced. The respective melt complex viscosity-angular frequency curves are superposed onto the melt complex viscosity-angular frequency curve of the ethylene-α-olefin copolymer at 190° C. in accordance with the principle of temperature-time superposition, thereby determining respective shift factors (a$_T$). Then, a linear approximate equation (the following formula (I)) of [ln(a$_T$)] and [1/(T+273.16)] is calculated by the least-square method from the respective temperatures (T) and the shift factor (a$_T$) at each temperature (T). Subsequently, Ea is obtained from the gradient m of the linear equation and the following formula (II).

$$\ln(a_T) = m(1/(T+273.16)) + n \quad (I)$$

$$Ea = |0.008314 \times m| \quad (II)$$

a$_T$: shift factor
Ea: activation energy of flow (unit: kJ/mol)
T: temperature (unit: ° C.)

The calculation may use commercially available calculation software, and examples of the calculation software include Rhios V.4.4.4 produced by Rheometrics.

The shift factor (a$_T$) is shift amount generated when both logarithmic curves of melt complex viscosity-angular frequency at the respective temperatures (T) are shifted to the direction of log(Y)=− log (X) axis, provided that Y-axis indicates melt complex viscosity and X-axis indicates angular frequency, and are superposed on melt complex viscosity-angular frequency curve at 190° C. In the superposition, both logarithmic curves of melt complex viscosity-angular frequency at the respective temperatures (T) are shifted to $a_T$ times in angular frequency and to $1/a_T$ times in melt complex viscosity.

In addition, a correlation coefficient is determined to be 0.99 or more, the correlation coefficient being used in the calculation by the least-square method of the linear approximate equation (I) produced from measurement temperatures and the shift factors at four temperatures including 190° C. and three temperatures selected from among 130° C., 150° C., 170° C. and 210° C.

The measurement of the above-mentioned melt complex viscosity-angular frequency curve is performed using a viscoelasticity measuring apparatus (e.g. Rheometrics Mechanical Spectrometer RMS-800 manufactured by Rheometrics), usually, under the conditions of geometry: parallel plates, a plate diameter: 25 mm, a plate interval: 1.2 to 2 mm, a strain: 5%, and an angular frequency: 0.1 to 100 rad/sec. The measurement is performed under a nitrogen atmosphere, and it is preferred to blend an appropriate amount (e.g., 1000 ppm) of an antioxidant into a measurement sample in advance.

Fraction of the ethylene-α-olefin copolymer of the present invention, the fraction having a molecular weight determined by 3D-GPC of $10^{6.5}$ g/mol, has a branching index g' of 0.26 or more. The branching index g' is defined below. When the intrinsic viscosity of a polyethylene having long chain branches (henceforth sometimes referred to as "long chain branch-containing polyethylene") is denoted by $[\eta_{br}]$ and the intrinsic viscosity of a linear polyethylene having a molecular weight equal to that of the long chain branch-containing polyethylene is denoted by $[\eta_\perp]$, $g'=[\eta_{br}]/[\eta_\perp]$.

Figure 2:
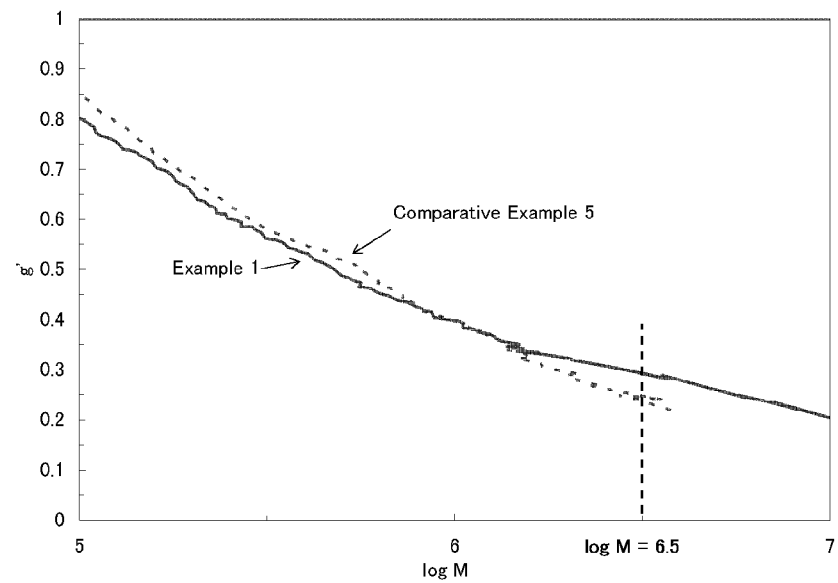
FIG. 2 is a diagram showing the branching index g' of an ethylene-α-olefin copolymer.

When a long chain branch-containing polyethylene is compared with a linear polyethylene having a molecular weight equal to that of the long chain branch-containing polyethylene, the long chain branch-containing polyethylene is smaller in radius of gyration and lower in viscosity. That is, the branching index g' is 1 or less. As described above, the ethylene-α-olefin copolymer of the present invention is a copolymer having a high Ea, in other words, containing many long chain branches. However, high molecular weight fraction in the copolymer of the present invention has few long chain branches. As an index thereof, the g' of fraction having a molecular weight determined by 3D-GPC of $10^{6.5}$ g/mol is adopted in the present invention. As shown in FIG. 1, the fraction having a molecular weight of $10^{6.5}$ g/mol is high molecular weight fraction in a copolymer. In FIG. 1, the abscissa represents the molecular weight of a copolymer and the ordinate represents strength. In FIG. 2, the abscissa represents the molecular weight of a copolymer and the ordinate represents g'.

In the ethylene-α-olefin copolymer of the present invention, the fraction having a molecular weight of $10^{6.5}$ g/mol of the copolymer has a branching index g' of 0.26 or more, wherein the molecular weight is determined by 3D-GPC. The g' is preferably 0.28 or more, more preferably 0.30 or more, and even more preferably 0.32 or more. The g' is preferably 0.60 or less, more preferably 0.50 or less, and even more preferably 0.40 or less.

The g' is expressed by the formula provided above. In order to calculate the g', the intrinsic viscosity of a sample ($[\eta_{br}]$) and the intrinsic viscosity of a linear polyethylene ($[\eta_\perp]$) having a molecular weight equal to that of the sample and containing no long chain branches are measured under the conditions given below by using a GPC apparatus (3D-GPC) equipped with a viscosity detector and a RALLS light scattering detector.

Instrument: HLC-8120GPC manufactured by TOSOH Corporation

RI Detector: Detector included in HLC-8120GPC manufactured by TOSOH Corporation

Viscosity detector: Viscotek HSO2

RALLS light scattering detector: Precision Detectors PD2040

Separation column: GMHHR-H(S) HT three columns, produced by TOSOH Corporation

Measurement temperature: 135° C.

Carrier: orthodichlorobenzene (with addition of BHT 0.05 wt %)

Flow rate: 1 mL/min

Injection amount: 300 μL

Sample concentration: 2.0 mg/mL

Analysis software: OmniSEC ver. 4.2

From the viewpoint of enhancing melt tension or strain hardening property, it is preferred for the ethylene-α-olefin copolymer of the present invention that the number of long chain branches per 1000 carbon atoms constituting the copolymer (the density of LCB) is 0.20 or more, more preferably 0.22 or more, even more preferably 0.24 or more. From the viewpoint of improving mechanical strength, the density of LCB is preferably 0.60 or less, more preferably 0.50 or less, even more preferably 0.30 or less.

The number of long chain branches (LCB) per 1000 carbon atoms in a copolymer was determined by measuring a carbon nuclear magnetic resonance ($^{13}$C-NMR) spectrum of the copolymer according to the following measurement conditions.

(Measurement Conditions)

Instrument: AVANCE600 manufactured by Bruker Corporation

Measurement probe: 10-mm cryoprobe

Measurement solvent: mixed solvent of 1,2-dichlorobenzene/1,2-dichlorobenzene-$d_4$=75/25

(Volumetric Ratio)

Measurement temperature: 130° C.

Measurement method: proton decoupling method

Pulse width: 45 degrees

Pulse repetition time: 4 seconds

Measurement standard: tetramethylsilane

Window function: exponential or Gaussian

Transients: 2,500

<Method for Calculating the Number of Long Chain Branches (LCB)>

When in a $^{13}$C NMR spectrum, the sum total of the peak areas of all peaks having peak tops between 5 ppm to 50 ppm is taken as 1000, the peak area of the peaks derived from methine carbon atoms to which branches having 7 or more carbon atoms are attached is defined as LCB. LCB is the number of branches existing per 1000 carbon atoms in a copolymer, the branches having 7 or more carbon atoms. Under the present measurement conditions, LCB was determined from the peak area of the peak having a peak top in the vicinity of from 38.22 ppm to 38.27 ppm. The peak area of this peak is the area of the signals found within the range of from the chemical shift of the valley present between a first peak located on the highest magnetic field side out of the peaks located within the above-mentioned range and the peak adjoining on the higher magnetic field side to the first peak to the chemical shift of the valley present between a second peak located on the lowest magnetic field side out of the peaks located within the above-mentioned range and the peak adjoining on the lower magnetic field side to the second peak. In the measurement of an ethylene-1-octene copolymer under the present measurement conditions, the position of the peak top of a peak derived from methine carbon to which a hexyl branch was attached was 38.21 ppm.

<Method for Producing ethylene-α-olefin Copolymer>

The ethylene-α-olefin copolymer of the present invention is obtained by copolymerizing ethylene with an α-olefin using a catalyst for polymerization prepared by bringing a transition metal compound (A) given below, a transition metal compound (B) given below, and a cocatalyst component (C) for activation into contact with each other.

Transition metal compound (A): a transition metal compound represented by formula (1)

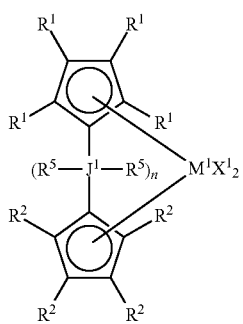

(1)

wherein $M^1$ represents a transition metal atom of Group 4 of the periodic table of the elements; $R^1$ and $R^2$ each independently represent a hydrogen atom or a hydrocarbyl group having 1 to 20 carbon atoms and optionally having a substituent; at least one group selected from the group consisting of the $R^1$ groups and the $R^2$ groups is an aryl group having 6 to 20 carbon atoms and optionally having a substituent; the $R^1$ groups are the same or different; the $R^2$ groups are the same or different; $X^1$ groups each independently represent a hydrogen atom, a halogen atom, a hydrocarbyl group having 1 to 20 carbon atoms and optionally having a substituent, a hydrocarbyloxy group having 1 to 20 carbon atoms and optionally having a substituent, a substituted silyl group, or a substituted amino group; n represents an integer of 1 to 5; $J^1$ represents a carbon atom or a silicon atom, and when there are two or more $J^1$ groups, the $J^1$ groups are the same or different; $R^5$ groups each represent a hydrogen atom or a hydrocarbyl group having 1 to 20 carbon atoms and optionally having a substituent, and the $R^5$ groups are the same or different.

Transition metal compound (B): a transition metal compound represented by formula (2)

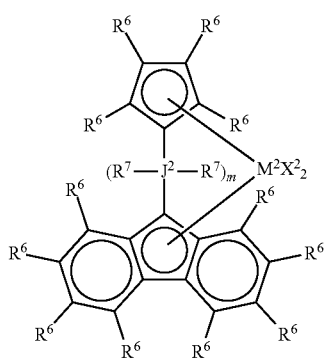

(2)

wherein $M^2$ represents a transition metal atom of Group 4 of the periodic table of the elements; $R^6$ groups each represent a hydrogen atom or a hydrocarbyl group having 1 to 20 carbon atoms and optionally having a substituent, and the $R^6$ groups are the same or different; $X^2$ groups each independently represent a hydrogen atom, a halogen atom, a hydrocarbyl group having 1 to 20 carbon atoms and optionally having a substituent, a hydrocarbyloxy group having 1 to 20 carbon atoms and optionally having a substituent, a substituted silyl group, or a substituted amino group; m represents an integer of 1 to 5; $J^2$ represents a carbon atom or a silicon atom, and when there are two or more $J^2$ groups, the $J^2$ groups are the same or different; $R^7$ groups each represent a hydrogen atom or a hydrocarbyl group having 1 to 20 carbon atoms and optionally having a substituent, and the $R^7$ groups are the same or different.

The transition metal compound (A) and the transition metal compound (B) are described in detail below.

$M^1$ in formula (1) is a transition metal atom of Group 4 of the periodic table of the elements, and it is preferably a titanium atom, a zirconium atom, or a hafnium atom, and more preferably a zirconium atom.

Examples of the hydrocarbyl group having 1 to 20 carbon atoms and optionally having a substituent as $R^1$ and $R^2$ include an alkyl group having 1 to 20 carbon atoms and optionally having a substituent, a cycloalkyl group having 3 to 20 carbon atoms and optionally having a substituent, an aralkyl group having 7 to 20 carbon atoms and optionally having a substituent, and an aryl group having 6 to 20 carbon atoms and optionally having a substituent.

Examples of the alkyl group having 1 to 20 carbon atoms and optionally having a substituent as $R^1$ and $R^2$ include an alkyl group having 1 to 20 carbon atoms, an alkyl group having 1 to 20 carbon atoms and substituted with a halogen atom, an alkyl group having 1 to 20 carbon atoms and substituted with a substituted silyl group having 1 to 20 carbon atoms, an alkyl group having 1 to 20 carbon atoms and substituted with a substituted amino group having 1 to 20 carbon atoms, and an alkyl group having 1 to 20 carbon atoms and substituted with a hydrocarbyloxy group having 1 to 20 carbon atoms.

Examples of the alkyl group having 1 to 20 carbon atoms include a methyl group, an ethyl group, a n-propyl group, an isopropyl group, a n-butyl group, a sec-butyl group, a tert-butyl group, a n-pentyl group, a neopentyl group, an isopentyl group, a n-hexyl group, a n-heptyl group, a n-octyl group, a n-decyl group, a n-nonyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-eicosyl group.

Examples of the alkyl group having 1 to 20 carbon atoms and substituted with a halogen atom include a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group, a diiodomethyl group, a triiodomethyl group, a fluoroethyl group, a difluoroethyl group, a trifluoroethyl group, a tetrafluoroethyl group, a pentafluoroethyl group, a chloroethyl group, a dichloroethyl group, a trichloroethyl group, a tetrachloroethyl group, a pentachloroethyl group, a bromoethyl group, a dibromoethyl group, a tribromoethyl group, a tetrabromoethyl group, a pentabromoethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a perchloropropyl group, a perchlorobutyl group, a perchloropentyl group, a perchlorohexyl group, a perchlorooctyl group, a perchlorododecyl group, a perchloropentadecyl group, a perchloroeicosyl group, a perbromopropyl group, a perbromobutyl group, a perbromopentyl group, a perbromohexyl group, a perbromooctyl group, a perbromododecyl group, a perbromopentadecyl group, and a perbromoeicosyl group.

Examples of the alkyl group having 1 to 20 carbon atoms and substituted with a substituted silyl group having 1 to 20 carbon atoms include a trimethylsilylmethyl group, a trimethylsilylethyl group, a trimethylsilylpropyl group, a trimethylsilylbutyl group, a bis(trimethylsilyl)methyl group, a bis(trimethylsilyl)ethyl group, a bis(trimethylsilyl) propyl group, a bis(trimethylsilyl)butyl group, and a triphenylsilylmethyl group.

Examples of the alkyl group having 1 to 20 carbon atoms and substituted with a substituted amino group having 1 to 20 carbon atoms include a dimethylaminomethyl group, a dimethylaminoethyl group, a dimethylaminopropyl group, a dimethylaminobutyl group, a bis(dimethylamino)methyl group, a bis(dimethylamino)ethyl group, a bis(dimethylamino)propyl group, a bis(dimethylamino)butyl group, a phenylaminomethyl group, and a diphenylaminomethyl group.

Examples of the alkyl group having 1 to 20 carbon atoms and substituted with a hydrocarbyloxy group having 1 to 20 carbon atoms include a methoxymethyl group, an ethoxymethyl group, a n-propoxymethyl group, an isopropoxymethyl group, a n-butoxymethyl group, a sec-butoxymethyl group, a tert-butoxymethyl group, a phenoxymethyl group, a methoxyethyl group, an ethoxyethyl group, a n-propoxyethyl group, an isopropoxy ethyl group, a n-butoxyethyl group, a sec-butoxyethyl group, a tert-butoxyethyl group, a phenoxyethyl group, a methoxy-n-propyl group, an ethoxy-n-propyl group, a n-propoxy-n-propyl group, an isopropoxy-n-propyl group, a n-butoxy-n-propyl group, a sec-butoxy-n-propyl group, a tert-butoxy-n-propyl group, a phenoxy-n-propyl group, a methoxy isopropyl group, an ethoxy isopropyl group, a n-propoxy isopropyl group, an isopropoxy isopropyl group, a n-butoxy isopropyl group, a sec-butoxy isopropyl group, a tert-butoxy isopropyl group, and a phenoxy isopropyl group.

Examples of the cycloalkyl group having 3 to 20 carbon atoms and optionally having a substituent as $R^1$ and $R^2$ include a cyclopropyl group, a cyclobutyl group, a cyclopentyl group, a cyclohexyl group, a cycloheptyl group, a cyclooctyl group, a 1-methylcyclopentyl group, a 1-methylcyclohexyl group, a 1-phenylcyclohexyl group, a 1-indanyl group, a 2-indanyl group, a norbornyl group, a bornyl group, a menthyl group, a 1-adamanthyl group, and a 2-adamanthyl group; preferred are cycloalkyl groups having 5 to 10 ring-forming carbon atoms such as a cyclopentyl group, a cyclohexyl group, a cycloheptyl group, a cyclooctyl group, a 1-methylcyclopentyl group, a 1-methylcyclohexyl group, a 1-indanyl group, a 2-indanyl group, a norbornyl group, a bornyl group, a menthyl group, a 1-adamanthyl group, and a 2-adamanthyl group, and more preferred are cycloalkyl groups having 6 to 10 ring-forming carbon atoms such as a cyclohexyl group, a 1-methylcyclohexyl group, a norbornyl group, a bornyl group, a 1-adamanthyl group, and a 2-adamanthyl group. These cycloalkyl groups may have a hydrocarbyl group having 1 to 10 carbon atoms as a substituent.

Examples of the aryl group having 6 to 20 carbon atoms and optionally having a substituent as $R^1$ and $R^2$ in formula (1) include an aryl group having 6 to 20 carbon atoms, an aryl group having 6 to 20 carbon atoms and substituted with a halogen atom, an aryl group having 6 to 20 carbon atoms and substituted with a substituted silyl group having 1 to 20 carbon atoms, an aryl group having 6 to 20 carbon atoms and substituted with a substituted amino group having 1 to 20 carbon atoms, and an aryl group having 6 to 20 carbon atoms and substituted with a hydrocarbyloxy group having 1 to 20 carbon atoms.

Examples of the aryl group having 6 to 20 carbon atoms include a phenyl group, a 2-tolyl group, a 3-tolyl group, a 4-tolyl group, a 2,3-xylylgroup, a 2,4-xylylgroup, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a diethylphenyl group, a triethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, and an anthracenyl group.

Examples of the aryl group having 6 to 20 carbon atoms and substituted with a halogen atom include a 2-fluorophenyl group, a 3-fluorophenyl group, a 4-fluorophenyl group, a 2-chlorophenyl group, a 3-chlorophenyl group, a 4-chlorophenyl group, a 2-bromophenyl group, a 3-bromophenyl group, a 4-bromophenyl group, a 2-iodophenyl group, a 3-iodophenyl group, and a 4-iodophenyl group.

Examples of the aryl group having 6 to 20 carbon atoms and substituted with a substituted silyl group having 1 to 20 carbon atoms include a trimethylsilylphenyl group and a bis(trimethylsilyl)phenyl group.

Examples of the aryl group having 6 to 20 carbon atoms and substituted with a substituted amino group having 1 to 20 carbon atoms include a dimethylaminophenyl group, a bis(dimethylamino)phenyl group, and a diphenylaminophenyl group.

Examples of the aryl group having 6 to 20 carbon atoms and substituted with a hydrocarbyloxy group having 1 to 20 carbon atoms include a methoxyphenyl group, an ethoxyphenyl group, a n-propoxyphenyl group, an isopropoxyphenyl group, a n-butoxyphenyl group, a sec-butoxyphenyl group, a tert-butoxyphenyl group, and a phenoxyphenyl group.

The aryl group having 6 to 20 carbon atoms and optionally having a substituent as $R^1$ and $R^2$ is preferably an aryl group having 6 to 20 carbon atoms, and more preferably a phenyl group.

Examples of the aralkyl group having 7 to 20 carbon atoms and optionally having a substituent include an aralkyl group having 7 to 20 carbon atoms and an aralkyl group having 7 to 20 carbon atoms and substituted with a halogen atom.

Examples of the aralkyl groups having 7 to 20 carbon atoms include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (4,6-dimethylphenyl)methyl group, a (2,3,4-trimethylphenyl)methyl group, a (2,3,5-trimethylphenyl)methyl group, a (2,3,6-trimethylphenyl) methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl) methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl)methyl group, a (n-tetradecylphenyl)methyl group, a naphthylmethyl group, an anthracenylmethyl group, a phenylethyl group, a phenylpropyl group, a phenylbutyl group, a diphenylmethyl group, a diphenylethyl group, a diphenylpropyl group, and a diphenylbutyl group.

Examples of the aralkyl group having 7 to 20 carbon atoms and substituted with a halogen atom include a 2-fluorobenzyl group, a 3-fluorobenzyl group, a 4-fluorobenzyl group, a 2-chlorobenzyl group, a 3-chlorobenzyl group, a 4-chlorobenzyl group, a 2-bromobenzyl group, a 3-bromobenzyl group, a 4-bromobenzyl group, a 2-iodobenzyl group, a 3-iodobenzyl group, and a 4-iodobenzyl group.

Preferred as $R^1$ and $R^2$ is a hydrogen atom or an aryl group having 6 to 20 carbon atoms and optionally having a substituent. At least one group selected from the group consisting of the $R^1$ groups and the $R^2$ groups is an aryl group having 6 to 20 carbon atoms and optionally having a substituent.

The $X^1$ groups in formula (1) each independently represent a hydrogen atom, a halogen atom, a hydrocarbyl group having 1 to 20 carbon atoms and optionally having a substituent, a hydrocarbyloxy group having 1 to 20 carbon atoms and optionally having a substituent, a substituted silyl group having 1 to 20 carbon atoms, or a substituted amino group having 1 to 20 carbon atoms.

Examples of the halogen atom as $X^1$ include a fluorine atom, a chlorine atom, a bromine atom, and an iodine atom.

Examples of the hydrocarbyl group having 1 to 20 carbon atoms and optionally having a substituent as $X^1$ include the same groups as those provided as examples of the hydrocarbyl group having 1 to 20 carbon atoms and optionally having a substituent as $R^1$ and $R^2$.

Examples of the hydrocarbyloxy group having 1 to 20 carbon atoms and optionally having a substituent as $X^1$ include an alkoxy group having 1 to 20 carbon atoms and optionally having a substituent, an aralkyloxy group having 7 to 20 carbon atoms and optionally having a substituent, and an aryloxy group having 6 to 20 carbon atoms and optionally having a substituent.

Examples of the alkoxy group having 1 to 20 carbon atoms and optionally having a substituent include an alkoxy group having 1 to 20 carbon atoms and an alkoxy group having 1 to 20 carbon atoms and substituted with a halogen atom.

Examples of the alkoxy groups having 1 to 20 carbon atoms include a methoxy group, an ethoxy group, a n-propoxy group, an isopropoxy group, a n-butoxy group, a sec-butoxy group, a tert-butoxy group, a n-pentyloxy group, a neopentyloxy group, a n-hexyloxy group, a n-octyloxy group, a n-nonyloxy group, a n-decyloxy group, a n-undecyloxy group, a n-dodecyloxy group, a n-tridecyloxy group, a n-tetradecyloxy group, a n-pentadecyloxy group, a n-hexadecyloxy group, a n-heptadecyloxy group, a n-octadecyloxy group, a n-nonadecyloxy group, and a n-eicosoxy group.

Examples of the alkoxy group having 1 to 20 carbon atoms substituted with a halogen atom include a fluoromethyloxy group, a difluoromethyloxy group, a trifluoromethyloxy group, a chloromethyloxy group, a dichloromethyloxy group, a trichloromethyloxy group, a bromomethyloxy group, a dibromomethyloxy group, a tribromomethyloxy group, an iodomethyloxy group, a diiodomethyloxy group, a triiodomethyloxy group, a fluoroethyloxy group, a difluoroethyloxy group, a trifluoroethyloxy group, a tetrafluoroethyloxy group, a pentafluoroethyloxy group, a chloroethyloxy group, a dichloroethyloxy group, a trichloroethyloxy group, a tetrachloroethyloxy group, a pentachloroethyloxy group, a bromoethyloxy group, a dibromoethyloxy group, a tribromoethyloxy group, a tetrabromoethyloxy group, a pentabromoethyloxy group, a perfluoropropyloxy group, a perfluorobutyloxy group, a perfluoropentyloxy group, a perfluorohexyloxy group, a perfluorooctyloxy group, a perfluorododecyloxy group, a perfluoropentadecyloxy group, a perfluoroeicosyloxy group, a perchloropropyloxy group, a perchlorobutyloxy group, a perchloropentyloxy group, a perchlorohexyloxy group, a perchlorooctyloxy group, a perchlorododecyloxy group, a perchloropentadecyloxy group, a perchloroeicosyloxy group, a perbromopropyloxy group, a perbromobutyloxy group, a perbromopentyloxy group, a perbromohexyloxy group, a perbromooctyloxy group, a perbromododecyloxy group, a perbromopentadecyloxy group, and a perbromoeicosyloxy group.

Examples of the aralkyloxy group having 7 to 20 carbon atoms and optionally having a substituent include an aralkyloxy group having 7 to 20 carbon atoms and an aralkyloxy group having 7 to 20 carbon atoms and substituted with a halogen atom.

Examples of the aralkyloxy group having 7 to 20 carbon atoms include a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a (n-tetradecylphenyl)methoxy group, a naphthylmethoxy group, and an anthracenylmethoxy group.

Examples of the aralkyloxy group having 7 to 20 carbon atoms and substituted with a halogen atom include a 2-fluorobenzyloxy group, a 3-fluorobenzyloxy group, a 4-fluorobenzyloxy group, a 2-chlorobenzyloxy group, a 3-chlorobenzyloxy group, a 4-chlorobenzyloxy group, a 2-bromobenzyloxy group, a 3-bromobenzyloxy group, a 4-bromobenzyloxy group, a 2-iodobenzyloxy group, a 3-iodobenzyloxy group, and a 4-iodobenzyloxy group.

Examples of the aryloxy group having 6 to 20 carbon atoms and optionally having a substituent include an aryloxy group having 6 to 20 carbon atoms and an aryloxy group having 6 to 20 carbon atoms and substituted with a halogen atom.

Examples of the aryloxy group having 6 to 20 carbon atoms include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group, and an anthracenoxy group.

Examples of the aryloxy group having 6 to 20 carbon atoms and substituted with a halogen atom include a 2-fluorophenyloxy group, a 3-fluorophenyloxy group, a 4-fluorophenyloxy group, a 2-chlorophenyloxy group, a 3-chlorophenyloxy group, a 4-chlorophenyloxy group, a 2-bromophenyloxy group, a 3-bromophenyloxy group, a 4-bromophenyloxy group, a 2-iodophenyloxy group, a 3-iodophenyloxy group, and a 4-iodophenyloxy group.

Examples of the substituted silyl group as $X^1$ include a monosubstituted silyl group substituted with a hydrocarbyl group having 1 to 20 carbon atoms, a disubstituted silyl group substituted with a hydrocarbyl group having 1 to 20 carbon atoms, and a trisubstituted silyl group substituted with a hydrocarbyl group having 1 to 20 carbon atoms. Examples of the hydrocarbyl group having 1 to 20 carbon atoms include an alkyl group having 1 to 20 carbon atoms and an aryl group having 6 to 20 carbon atoms. Examples of the monosubstituted silyl group substituted with a hydrocarbyl group having 1 to 20 carbon atoms include a methylsilyl group, an ethylsilyl group, a n-propylsilyl group, an isopropylsilyl group, a n-butylsilyl group, a sec-butylsilyl group, a tert-butylsilyl group, an isobutylsilyl group, a n-pentylsilyl group, a n-hexylsilyl group, and a phenylsilyl group. Examples of the disubstituted silyl group substituted with a hydrocarbyl group having 1 to 20 carbon atoms include a dimethylsilyl group, a diethylsilyl group, a di-n-propylsilyl group, a diisopropylsilyl group, a di-n-butylsilyl group, a di-sec-butylsilyl group, a di-tert-butylsilyl group, a diisobutylsilyl group, and a diphenylsilyl group. Examples of the trisubstituted silyl group substituted with a hydrocarbyl group having 1 to 20 carbon atoms include a trimethylsilyl group, a triethylsilyl group, a tri-n-propylsilyl group, a triisopropylsilyl group, a tri-n-butylsilyl group, a tri-sec-butylsilyl group, a tri-tert-butylsilyl group, a triisobutylsilyl group, a tert-butyl-dimethylsilyl group, a tri-n-pentylsilyl group, a tri-n-hexylsilyl group, a tricyclohexylsilyl group, and a triphenylsilyl group.

Examples of the substituted amino group as $X^1$ include an amino group substituted with a hydrocarbyl group having 1 to 20 carbon atoms. Examples of the hydrocarbyl group having 1 to 20 carbon atoms include an alkyl group having 1 to 20 carbon atoms and an aryl group having 6 to 20 carbon atoms. Examples of the amino group substituted with a hydrocarbyl group having 1 to 20 carbon atoms include a phenylamino group, a benzylamino group, a dimethylamino group, a diethylamino group, a di-n-propylamino group, a diisopropylamino group, a di-n-butylamino group, a di-sec-butylamino group, a di-tert-butylamino group, a di-isobutylamino group, a di-n-hexylamino group, a di-n-octylamino group, a di-n-decylamino group, a diphenylamino group, a dibenzylamino group, a tert-butylisopropylamino group, a phenylethylamino group, a phenylpropylamino group, a phenylbutylamino group, a pyrrolyl group, a pyrrolidinyl group, a piperidinyl group, a carbazolyl group, and a dihydroisoindolyl group.

Preferred as $X^1$ are a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenylphenoxy group, and a benzyl group, more preferred are a chlorine atom, a methyl group, a phenoxy group, and a benzyl group, and even more preferred is a chlorine atom.

n in formula (1) is an integer of 1 to 5. n is preferably 1 to 2.

$J^1$ in formula (1) represents a carbon atom or a silicon atom, and when there are two or more $J^1$ groups, the $J^1$ groups are the same or different.

$R^5$ groups in formula (1) each independently represent a hydrogen atom or a hydrocarbyl group having 1 to 20 carbon atoms and optionally having a substituent.

Examples of the hydrocarbyl group having 1 to 20 carbon atoms and optionally having a substituent as $R^5$ include the same groups as those provided as examples of the hydrocarbyl group having 1 to 20 carbon atoms and optionally having a substituent as $R^1$ and $R^2$.

Examples of the bridging group in formula (1) represented by formula (3)

(3)

include a methylene group, an ethylidene group, an ethylene group, a propylidene group, a propylene group, a butylidene group, a butylene group, a pentylidene group, a pentylene group, a hexylidene group, an isopropylidene group, a methylethylmethylene group, a methylpropylmethylene group, a methylbutylmethylene group, a bis(cyclohexyl)methylene group, a methylphenylmethylene group, a diphenylmethylene group, a phenyl(methylphenyl)methylene group, a di(methylphenyl)methylene group, a bis(dimethylphenyl)methylene group, a bis(trimethylphenyl)methylene group, a phenyl(ethylphenyl)methylene group, a di(ethylphenyl)methylene group, a bis(diethylphenyl)methylene group, a phenyl(propylphenyl)methylene group, a di(propylphenyl)methylene group, a bis(dipropylphenyl)methylene group, a phenyl(butylphenyl)methylene group, a di(butylphenyl)methylene group, a phenyl(naphthyl)methylene group, a di(naphthyl)methylene group, a phenyl(biphenyl)methylene group, a di(biphenyl)methylene group, a phenyl(trimethylsilylphenyl)methylene group, a bis(trimethylsilylphenyl)methylene group, a bis(pentafluorophenyl)methylene group, a silylene group, a disilylene group, a trisilylene group, a tetrasilylene group, a dimethylsilylene group, a bis(dimethylsilane)diyl group, a diethylsilylene group, a dipropylsilylene group, a dibutylsilylene group, a diphenylsilylene group, a silacyclobutanediyl group, a silacyclohexanediyl group, a divinylsilylene group, a diallylsilylene group, a (methyl)(vinyl)silylene group, and an (allyl)(methyl)silylene group.

Preferred as the bridging group represented by formula (3) are a methylene group, an ethylene group, an isopropylidene group, a bis(cyclohexyl)methylene group, a diphenylmethylene group, a dimethylsilylene group, a bis(dimethylsilane)diyl group, and a diphenylsilylene group, and more preferred are an isopropylidene group and a dimethylsilylene group.

Examples of the transition metal compound (A) represented by formula (1) include dimethylsilylenebis(2-phenylcyclopentadienyl)zirconium dichloride, dimethylsilylenebis(3-phenylcyclopentadienyl)zirconium dichloride, dimethylsilylenebis(2,3-diphenylcyclopentadienyl)zirconium dichloride, dimethylsilylenebis(2,4-diphenylcyclopentadienyl)zirconium dichloride, dimethylsilylenebis(2,5-diphenylcyclopentadienyl)zirconium dichloride, dimethylsilylenebis(3,4-diphenylcyclopentadienyl)zirconium dichloride, dimethylsilylenebis(2,3,4-triphenylcyclopentadienyl)zirconium dichloride, dimethylsilylenebis(2,3,5-triphenylcyclopentadienyl)zirconium dichloride, and dimethylsilylenebis(tetraphenylcyclopentadienyl)zirconium dichloride, and compounds having names produced by changing "dimethylsilylene" in the preceding compound names to "methylene", "ethylene", "isopropylidene", "bis(cyclohexyl)methylene", "diphenylmethylene", "dimethylsilylene", "bis(dimethylsilane)diyl", or "diphenylsilylene", and compounds having names produced by changing "dichloride" in the preceding compound names to "difluoride", "dibromide", "diiodide", "dimethyl", "diethyl", "diisopropyl", "diphenyl", "dibenzyl", "dimethoxide", "diethoxide", "di(n-propoxide)", "di(isopropoxide)", "diphenoxide", or "di(pentafluorophenoxide)."

Preferred as the transition metal compound represented by formula (1) is dimethylsilylenebis(3-phenylcyclopentadienyl)dichloride.

Only one transition metal compound represented by formula (1) may be used or alternatively two or more transition metal compounds represented by formula (1) may be used. Although some isomers may exist depending on the position and the number of the substituent(s) attaching to the cyclopentadienyl ring, only one of the isomers may be used singly or alternatively a mixture containing two or more isomers in arbitrary proportions may be used.

$M^2$ in formula (2) represents a transition metal atom of Group 4 of the periodic table of the elements; preferred examples thereof include a titanium atom, a zirconium atom, and a hafnium atom, and more preferred is a zirconium atom.

$R^6$ groups in formula (2) each independently represent a hydrogen atom or a hydrocarbyl group having 1 to 20 carbon atoms and optionally having a substituent.

Examples of the hydrocarbyl group having 1 to 20 carbon atoms and optionally having a substituent as $R^6$ in formula (2) include the same groups as those provided as examples of the hydrocarbyl group having 1 to 20 carbon atoms and optionally having a substituent as $R^1$ and $R^2$ in formula (1).

Preferred as $R^6$ in formula (2) is a hydrogen atom or an alkyl group having 1 to 20 carbon atoms and optionally having a substituent, and more preferred is a hydrogen atom.

$X^2$ groups in formula (2) each independently represent a hydrogen atom, a halogen atom, a hydrocarbyl group having 1 to 20 carbon atoms and optionally having a substituent, a hydrocarbyloxy group having 1 to 20 carbon atoms and optionally having a substituent, a substituted silyl group, or a substituted amino group.

Examples of $X^2$ in formula (2) include the same groups as those provided as examples of $X^1$ in formula (1).

Preferred as $X^2$ in formula (2) are a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenylphenoxy group, and a benzyl group, more preferred are a chlorine atom, a methyl group, a phenoxy group, and a benzyl group, and even more preferred is a chlorine atom.

m in formula (2) is an integer of 1 to 5. m is preferably 1.

$J^2$ in formula (2) represents a carbon atom or a silicon atom, and when there are two or more $J^2$ groups, the $J^2$ groups are the same or different.

$R^7$ groups in formula (2) each independently represent a hydrogen atom or a hydrocarbyl group having 1 to 20 carbon atoms and optionally having a substituent.

Examples of $R^7$ in formula (2) include the same groups as those provided as examples of $R^5$ in formula (1).

Examples of the bridging group represented by formula (4) given below and existing in formula (2) include the same groups as those provided as examples of the bridging group represented by the above-provided formula (3).

Preferred as the bridging group represented by formula (4) are a methylene group, an isopropylidene group, a diphenylmethylene group, a methylphenyl methylene group, and a dimethylsilylene group, and more preferred are an isopropylidene group and a diphenylmethylene group.

Examples of the transition metal compound (B) represented by formula (2) include diphenylmethylene(1-cyclopentadienyl) (9-fluorenyl)zirconium dichloride, diphenylmethylene(2-methyl-1-cyclopentadienyl)(9-fluorenyl) zirconium dichloride, diphenylmethylene(3-methyl-1-cyclopentadienyl)(9-fluorenyl) zirconium dichloride, diphenylmethylene(2,4-dimethyl-1-cyclopentadienyl) (9-fluorenyl)zirconium dichloride, diphenylmethylene(2,5-dimethyl-1-cyclopentadienyl) (9-fluorenyl)zirconium dichloride, diphenylmethylene(3,4-dimethyl-1-cyclopentadienyl) (9-fluorenyl)zirconium dichloride, diphenylmethylene(2,3,4-trimethyl-1-cyclopentadienyl) (9-fluorenyl)zirconium dichloride, diphenylmethylene(2,3,5-trimethyl-1-cyclopentadienyl) (9-fluorenyl)zirconium dichloride, diphenylmethylene(3,4,5-trimethyl-1-cyclopentadienyl) (9-fluorenyl)zirconium dichloride, diphenylmethylene(2,3,4,5-tetramethyl-1-cyclopentadienyl) (9-fluorenyl)zirconium dichloride, diphenylmethylene(1-cyclopentadienyl)(2,7-dimethyl-9-fluorenyl)zirconium dichloride, diphenylmethylene(2-methyl-1-cyclopentadienyl)(2,7-dimethyl-9-fluorenyl)zirconium dichloride, diphenylmethylene(3-methyl-1-cyclopentadienyl)(2,7-dimethyl-9-fluorenyl)zirconium dichloride, diphenylmethylene(2,4-dimethyl-1-cyclopentadienyl)(2,7-dimethyl-9-fluorenyl)zirconium dichloride, diphenylmethylene(2,5-dimethyl-1-cyclopentadienyl)(2,7-dimethyl-9-fluorenyl)zirconium dichloride, diphenylmethylene(3,4-dimethyl-1-cyclopentadienyl)(2,7-dimethyl-9-fluorenyl)zirconium dichloride, diphenylmethylene(2,3,4-trimethyl-1-cyclopentadienyl)(2,7-dimethyl-9-fluorenyl) zirconium dichloride, diphenylmethylene(2,3,5-trimethyl-1-cyclopentadienyl)(2,7-dimethyl-9-fluorenyl)zirconium dichloride, diphenylmethylene(3,4,5-trimethyl-1-cyclopentadienyl)(2,7-dimethyl-9-fluorenyl)zirconium dichloride, diphenylmethylene(2,3,4,5-tetramethyl-1-cyclopentadienyl)(2,7-dimethyl-9-fluorenyl)zirconium dichloride, diphenylmethylene(1-cyclopentadienyl)(2,7-di-tert-butyl-9-fluorenyl) zirconium dichloride, diphenylmethylene(2-methyl-1-cyclopentadienyl)(2,7-di-tert-butyl-9-fluorenyl)zirconium dichloride, diphenylmethylene(3-methyl-1-cyclopentadienyl)(2,7-di-tert-butyl-9-fluorenyl)zirconium dichloride, diphenylmethylene(2,4-dimethyl-1-cyclopentadienyl)(2,7-di-tert-butyl-9-fluorenyl)zirconium dichloride, diphenylmethylene(2,5-dimethyl-1-cyclopentadienyl)(2,7-di-tert-butyl-9-fluorenyl)zirconium dichloride, diphenylmethylene(3,4-dimethyl-1-cyclopentadienyl)(2,7-di-tert-butyl-9-fluorenyl)zirconium dichloride, diphenylmethylene(2,3,4-trimethyl-1-cyclopentadienyl)(2,7-di-tert-butyl-9-fluorenyl) zirconium dichloride, diphenylmethylene(2,3,5-trimethyl-1- cyclopentadienyl)(2,7-di-tert-butyl-9-fluorenyl)zirconium dichloride, diphenylmethylene(3,4,5-trimethyl-1-cyclopentadienyl)(2,7-di-tert-butyl-9-fluorenyl)zirconium dichloride, diphenylmethylene(2,3,4,5-tetramethyl-1-cyclopentadienyl)(2,7-di-tert-butyl-9-fluorenyl)zirconium dichloride, compounds having names produced by changing "dichloride" in the preceding compound names to "difluoride", "dibromide", "diiodide", "dimethyl", "diethyl", "diisopropyl", "diphenyl", "dibenzyl", "dimethoxide", "diethoxide", "di(n-propoxide)", "di(isopropoxide)", "diphenoxide", or "di(pentafluorophenoxide)", and compounds having names produced by changing "diphenylmethylene" in the preceding compound names to "methylene", "isopropylidene", "methylphenyl methylene", or "dimethylsilylene."

Preferred as the transition metal compound represented by formula (2) is diphenylmethylene(cyclopentadienyl) (fluorenyl)zirconium dichloride.

Only one transition metal compound represented by formula (2) may be used or alternatively two or more transition metal compounds represented by formula (2) may be used. Although some isomers may exist depending on the position and the number of the substituent(s) attaching to the cyclopentadienyl ring and the fluorenyl ring, only one of the isomers may be used singly or alternatively a mixture containing two or more isomers in arbitrary proportions may be used.

<Cocatalyst Component (C) for Activation>

The cocatalyst component for activation is not particularly restricted if it is one that activates a transition metal compound (A) and a transition metal compound (B) and makes them polymerizing monomers, and examples thereof include compounds selected from the group consisting of (C-1) an organoaluminum compound and (C-2) a boron compound.

Preferably, the organoaluminum compound (C-1) is anyone of compounds represented by the formulae given below or a mixture thereof:

(C-1-1) a compound represented by $E^1_c AlZ^1_{(3-c)}$
(C-1-2) a cyclic aluminoxane represented by $\{-Al(E^2)-O-\}_d$
(C-1-3) a linear aluminoxane represented by $E^3\{-Al(E^3)-O-\}_e AlE^3_2$ wherein $E^1$, $E^2$, and $E^3$ are each a hydrocarbyl group having 1 to 8 carbon atoms; when there are two or more $E^1$ groups, the $E^1$ groups are the same or different, the $E^2$ groups are the same or different, when there are two or more $E^3$ groups, the $E^3$ groups are the same or different; $Z^1$ represents a hydrogen atom or a halogen atom; when there are two or more $Z^1$ groups, the $Z^1$ groups are the same or different; c represents a number satisfying 0<c≤3, d represents an integer of 2 or more, and e represents an integer of 1 or more.

Examples of the organoaluminum compound (C-1-1) include trialkylaluminums such as trimethylaluminum, triethylaluminum, tripropylaluminum, triisobutylaluminum, and trihexylaluminum; dialkylaluminum chlorides such as dimethylaluminum chloride, diethylaluminum chloride, dipropylaluminum chloride, diisobutylaluminum chloride, and dihexylaluminum chloride; alkylaluminum dichlorides such as methylaluminum dichloride, ethylaluminum dichloride, propylaluminum dichloride, isobutylaluminum dichloride, and hexylaluminum dichloride; and dialkylaluminum hydrides such as dimethylaluminum hydride, diethylaluminum hydride, dipropylaluminum hydride, diisobutylaluminum hydride, and dihexylaluminum hydride. Especially, trialkylaluminiums are preferred, and triethylaluminum or triisobutylaluminum is more preferred.

Examples of $E^2$ and $E^3$ in the formulae provided above include alkyl groups such as a methyl group, an ethyl group, a normal propyl group, an isopropyl group, a normal butyl group, an isobutyl group, a normal pentyl group, and a neopentyl group. Especially, a methyl group or an isobutyl group is preferred. d is an integer of 2 or more, preferably an integer of 2 to 40; and e is an integer of 1 or more, preferably an integer of 1 to 40.

The method for producing the above-described aluminoxane is not particularly restricted. Examples thereof include a method in which a solution prepared by dissolving a trialkylaluminum (e.g., trimethylaluminum) in a suitable organic solvent (e.g., benzene or an aliphatic hydrocarbyl) is brought into contact with water, and a method in which a trialkylaluminum (e.g., trimethylaluminum) is brought into contact with a metal salt containing water of crystallization (e.g., copper sulfate hydrate).

Examples of the above-mentioned boron compound (C-2) include the compounds provided below:

(C-2-1) a boron compound represented by formula $BR^{13}R^{14}R^{15}$
(C-2-2) a boron compound represented by formula $M^{3+}(BR^{13}R^{14}R^{15}R^{16})^-$
(C-2-3) a boron compound represented by formula $(M^4\text{-H})^+(BR^{13}R^{14}R^{15}R^{16})^-$ wherein $R^{13}$, $R^{14}$, $R^{15}$ and $R^{16}$ are each a halogen atom, a hydrocarbyl group having 1 to 20 carbon atoms, a halogenated hydrocarbyl group having 1 to 20 carbon atoms, a substituted silyl group having 1 to 20 carbon atoms, an alkoxy group having 1 to 20 carbon atoms, or a di-substituted amino group having 2 to 20 carbon atoms; $M^{3+}$ is an inorganic or organic cation; $M^4$ is a neutral Lewis base; $(M^4\text{-H})^+$ is a Brønsted acid. $R^{13}$, $R^{14}$, $R^{15}$ and are each preferably a halogen atom, a hydrocarbyl group having 1 to 20 carbon atoms, or a halogenated hydrocarbyl group having 1 to 20 carbon atoms.

Examples of the compound represented by formula (C-2-1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, and phenylbis(pentafluorophenyl)borane.

Especially, tris(pentafluorophenyl)borane is most preferred.

Examples of the $M^{3+}$ in formula (C-2-2) include a ferrocenium cation, an alkyl-substituted ferrocenium cation, a silver cation, and a triphenylmethyl cation. Examples of the $(BR^{13}R^{14}R^{15}R^{16})^-$ in formula (C-2-2) include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,2,4-trifluorophenyl)borate, phenylbis(pentafluorophenyl)borate, and tetrakis(3,5-bis-trifluoromethylphenyl)borate.

Examples of the compound of formula (C-2-2) include ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis(pentafluorophenyl)borate, and triphenylmethyl tetrakis(3,5-bistrifluoromethylphenyl)borate. Especially, the most preferred is triphenylmethyl tetrakis(pentafluorophenyl)borate.

Examples of the $(M^4\text{-H})^+$ in formula (C-2-3) include trialkyl-substituted ammonium, N,N-dialkylanilinium, dialkylammonium, and triarylphosphonium. Examples of the $(BR^{13}R^{14}R^{15}R^{16})^-$ in the formula (C-2-3) include the same anions as those provided previously. Examples of the compound of formula (C-2-3) include triethylammonium tetrakis(pentafluorophenyl)borate, tripropylammonium tetrakis(pentafluorophenyl)borate, tri(n-butyl)ammonium tetrakis(3,5-bis-trifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl)borate, N,N-dimethylanilinium tetrakis(3,5-bis-trifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, and tri(dimethylphenyl)phosphonium tetrakis(pentafluorophenyl)borate. Especially, the most preferred is tri(n-butyl)ammonium tetrakis(pentafluorophenyl)borate or N,N-dimethylanilinium tetrakis(pentafluorophenyl)borate.

Preferably, the cocatalyst component (C) for activation are the organoaluminum compound (C-1-2), the organoaluminum compound (C-1-3), a mixture of the organoaluminum compound (C-1-2) and the organoaluminum compound (C-1-3), the boron compound (C-2), or a mixture of the organoaluminum compound (C-1-1) and the boron compound (C-2).

When producing an ethylene-α-olefin copolymer according to the present invention by polymerization accompanied by the formation of polymer particles (for example, slurry polymerization, vapor phase polymerization, and bulk polymerization), it is preferred to use modified particles of the following (I) or of the following (II) as the cocatalyst component (C) for activation, and it is more preferred to use an organoaluminum compound (C-1-1), and modified particles of the following (I) or of the following (II) in combination. The use as the cocatalyst component (C) for activation of a clay mineral or anion exchange layered component optionally having been treated chemically or physically is also allowed.

(I) Modified particles produced by bringing the following (a), the following (b), the following (c), and particles (d) into contact with each other;
(a): compound represented by formula (5)

$$M^5 L^1_f \qquad (5)$$

(b): compound represented by formula (6)

$$R^{17}_{(t-1)} TH \qquad (6)$$

(c): compound represented by formula (7)

$$R^{18}_{(t-2)} TH_2 \qquad (7)$$

wherein in the above formulae (5), (6) and (7), $M^5$ represents a main group metal atom of Group 1, 2, 12, 14, or 15 of the Periodic Table; f represents a valence of $M^5$; $L^1$ represents a hydrogen atom, a halogen atom, or a hydrocarbyl group, and when there are two or more $L^1$ groups, the $L^1$ groups are the same or different; $R^{17}$ represents an electron-withdrawing group or a group containing an electron-withdrawing group, and when there are two or more $R^{17}$ groups, the $R^{17}$ groups are the same or different; $R^{18}$ represents a hydrocarbyl group or a halogenated hydrocarbyl group; T each independently represents an atom of Group 15 or Group 16 of the periodic table, and t represents the valence of T of each compound.

(II) Modified Particles Produced by Bringing Aluminoxane (e) and Particles (d) into Contact with Each Other.

These will be further described in order below.

Examples of the compound (a) include dialkylzincs, and preferred is dimethylzinc, diethylzinc, dipropylzinc, di-n-butylzinc, diisobutylzinc, or di-n-hexylzinc.

Examples of the compound (b) include 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, and 3,4,5-tris(trifluoromethyl)phenol.

Examples of the compound (c) include water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline, 2,4,6-tris(trifluoromethyl)aniline, and 3,4,5-tris(trifluoromethyl)aniline. Preferred is water or pentafluoroaniline.

As the particles (d), a material commonly used as a carrier is preferably used, and porous inorganic oxides are preferred. Preferably, the particle size distribution of the particles (d) is small.

Examples of the inorganic oxide include $SiO_2$, $Al_2O_3$, MgO, $ZrO_2$, $TiO_2$, $B_2O_3$, CaO, ZnO, BaO, $ThO_2$, and mixtures thereof, such as $SiO_2$—MgO, $SiO_2$—$Al_2O_3$, $SiO_2$—$TiO_2$, $SiO_2$—$V_2O_5$, $SiO_2$—$Cr_2O_3$, and $SiO_2$—$TiO_2$—MgO. The inorganic oxide is preferably $SiO_2$, $Al_2O_3$, or both $SiO_2$ and $Al_2O_3$, and especially silica is preferred.

The used amounts of the compounds (a), (b), and (c) are not particular limited. It is preferred that y and z satisfy the following formula (U) where the molar ratio of the used amounts of these compounds is (a):(b):(c)=1:y:z.

$$|f-y-2z| \le 1 \qquad (U)$$

(In the formula (U), f represents the valence of $M^5$.)

y in the above formula (U) is preferably a number of from 0.01 to 1.99, more preferably a number of from 0.10 to 1.80, even more preferably a number of from 0.20 to 1.50, and most preferably a number of from 0.30 to 1.00. The preferred range of z in the above formula (U) is determined by d, y, and the above formula (U).

More preferably, the used amounts of the compounds (a), (b), and (c) satisfy the following formulae (U), (V), and (W).

$$|f-y-2z| \le 1 \qquad (U)$$

$$z \ge -2.5y + 2.48 \qquad (V)$$

$$y < 0.5f \qquad (W)$$

Specifically, when f is 2, y usually takes a value of from 0.5 to 0.99, preferably from 0.55 to 0.95, more preferably from 0.6 to 0.9, and most preferably from 0.7 to 0.8. z in this case is calculated using the valence of $M^5$, the molar proportion of the used amount of the compound (b), and the above-provided formulae (U) to (W).

Preferred as aluminoxane (e) are the aforementioned organoaluminum compounds (C-1-2) and (C-1-3).

The method for bringing the aluminoxane (e) into contact with the particles (d) is not particularly restricted. One example of the method is a method of adding the aluminoxane (e) into a solvent in which the particles (d) have been dispersed. Preferred is a solvent that does not react with the aluminoxane (e), and more preferred is a solvent that dissolves the aluminoxane (e). The solvent is preferably an aromatic hydrocarbyl solvent, such as benzene, toluene, and xylene, or an aliphatic hydrocarbyl solvent, such as hexane, heptane, and octane, and more preferred is toluene or xylene.

The temperature and the time to bring the aluminoxane (e) into contact with the particles (d) are not limited, and the temperature is usually −100° C. to 200° C., preferably −50° C. to 150° C., and more preferably −20° C. to 120° C. Especially in the initial stage of the contact, it is preferred to bring them into contact with each other at a low temperature in order to suppress generation of heat by a reaction. The used amounts of the aluminoxane (e) and the particles (b) are not particularly limited. The amount of the aluminoxane (e) as atomic aluminum in the aluminoxane to be used is usually 0.01 to 100 mmol, preferably 0.1 to 20 mmol, more preferably 1 to 10 mmol per gram of the particles (d).

The ethylene-α-olefin copolymer of the present invention is produced by bringing a transition metal compound (A), a transition metal compound (B), and a cocatalyst component (C) for activation into contact with each other to form a catalyst, and then polymerizing monomers using the catalyst.

The contact treatment of the transition metal compound (A), the transition metal compound (B), and the cocatalyst component (C) for activation may be conducted by any means by which the transition metal compound (A), the transition metal compound (B), and the cocatalyst component (C) for activation are successfully brought into contact with each other and a catalyst is formed. Examples of the contact treatment method include a method in which the transition metal compound (A), the transition metal compound (B) and the cocatalyst component (C) for activation are mixed directly, a method in which the respective components are diluted with a solvent and then the components are mixed, and a method in which the transition metal compound (A), the transition metal compound (B), and the cocatalyst component (C) for activation are fed separately into a polymerization vessel, and then these are brought into contact with each other in the vessel. In some cases, two or more components are used in combination as the cocatalyst component (C) for activation, and some of them may be mixed with the transition metal compound (A) and the transition metal compound (B) beforehand, followed by further mixing the rest of component (C) with them or alternatively the respective components of component (C) may be fed separately to a polymerization vessel.

The molar ratio ([A]/[B]) of the transition metal compound (A) to the transition metal compound (B) can be determined with reference to the polymerization activity exhibited where the transition metal compound (A) or the transition metal compound (B) is used alone. Preferably, the [A]/[B] should just be determined so that the ratio of the weight of a polymer obtained from the transition metal compound (B) to the weight of a polymer obtained from the transition metal compound (A) may become 1 to 20. The [A]/[B] is preferably from 0.1 to 100, more preferably from 1 to 50.

When an organoaluminum compound (C-1) is used as the cocatalyst component (C) for activation, the molar ratio of the (C-1) to the total used amount of the transition metal compound (A) and the transition metal compound (B) is from 0.01 to 10000, preferably from 1 to 5000. When a boron compound (C-2) is used as the cocatalyst component (C) for activation, the molar ratio of the (C-2) to the total used amount of the transition metal compound (A) and the transition metal compound (B) is from 0.01 to 100, preferably from 1 to 50.

The concentration used when the respective components are fed into a polymerization reaction vessel in a solution state or in a state where they are suspended or slurried in a solvent is determined appropriately depending upon conditions including the performance of the apparatus that feeds the respective components to the polymerization reaction vessel. Generally, the concentration of the transition metal compound (A) or the transition metal compound (B) is usually 0.0001 to 100 mmol/L, preferably 0.001 to 50 mmol/L, more preferably 0.01 to 10 mmol/L. When an organoaluminum compound (C-1) is used, it may be used as received. When the organoaluminum compound (C-1) is diluted with a solvent, the concentration of the organoaluminum compound (C-1) as atomic Al in a solution is usually 0.01 to 10 mol/L, preferably 0.05 to 5 mol/L, more preferably 0.1 to 2 mol/L. The concentration of the boron compound (C-2) is usually 0.001 to 50 mmol/L, preferably 0.01 to 25 mmol/L, more preferably 0.05 to 10 mmol/L.

In the event that a transition metal compound (A), a transition metal compound (B), and an organoaluminum compound (C-1) are brought into contact with each other without the use of a boron compound (C-2) as a cocatalyst component (C) for activation, the organoaluminum compound (C-1) is preferably the aforementioned cyclic aluminoxane (C-1-2) and/or the linear aluminoxane (C-1-3). In the event that a transition metal compound (A), a transition metal compound (B), an organoaluminum compound (C-1), and a boron compound (C-2) are brought into contact with each other, the organoaluminum compound (C-1) is preferably the organoaluminum compound (C-1-1), and the boron compound (C-2) is preferably the boron compound (C-2-1) or the boron compound (C-2-2).

In producing the ethylene-α-olefin copolymer of the present invention, an electron-donating compound may be used in addition to a transition metal compound (A), a transition metal compound (B), and a cocatalyst component (C) for activation. Examples of such an electron-donating compound include oxygen-containing compounds, nitrogen-containing compounds, phosphorus-containing compounds, and sulfur-containing compounds; oxygen-containing compounds or nitrogen-containing compounds are particularly preferred. Examples of the oxygen-containing compound include alcohols, phenols, alkoxysilicons, ethers, ketones, aldehydes, carboxylic acids, esters of organic acids or inorganic acids, amides of organic acids or inorganic acids, and acid anhydrides; alkoxysilicons or ethers are particularly preferred. Examples of such nitrogen-containing compounds include amines, nitriles, and isocyanates; amines are preferred. Two or more electron-donating compounds may be used.

As a method for producing the ethylene-α-olefin copolymer of the present invention, ethylene and an α-olefin may be copolymerized by using, as a catalyst component for polymerization or a catalyst for polymerization, a prepolymerized solid catalyst component prepared by causing a small amount of monomer to undergo polymerization (hereinafter referred to as prepolymerization) using catalyst prepared by bringing the transition metal compound (A), the transition metal compound (B), the cocatalyst component (C) for activation, and optionally the electron-donating compound into contact with each other. In this situation, it is preferred to use the above-mentioned modified particles as the cocatalyst component (C) for activation.

The monomer to be used for prepolymerization is one or more monomers selected from among ethylene and α-olefins having 3 to 20 carbon atoms. Examples of the monomer include ethylene, propylene, 1-butene, 1-pentene, 1-hexene, 1-octene, 4-methyl-1-pentene, cyclopentene, and cyclohexene. Preferred is only ethylene or a combination of ethylene with one or more kinds of α-olefin, more preferred is only ethylene or a combination of ethylene with at least one α-olefin selected from among 1-butene, 1-hexene, and 1-octene.

The prepolymerization method may be either a continuous polymerization method or a batch polymerization method, and is, for example, a batch slurry polymerization method, a continuous slurry polymerization method, or a continuous vapor phase polymerization method.

When the prepolymerization is performed by the slurry polymerization method, a saturated aliphatic hydrocarbon compound is usually used as a solvent and examples thereof include propane, n-butane, isobutane, n-pentane, isopentane, n-hexane, cyclohexane, and heptane. Two or more solvents may be used. As the saturated aliphatic hydrocarbon compound, compounds having a boiling point at an ordinary pressure of 100° C. or lower are preferred, compounds having a boiling point at an ordinary pressure of 90° C. or lower are more preferred, and propane, n-butane, isobutane, n-pentane, isopentane, n-hexane, and cyclohexane are even more preferred.

The prepolymerization temperature is usually −20 to 100° C., preferably 0 to 80° C. The polymerization temperature may be readily varied during the prepolymerization. The partial pressure of a monomer in the vapor portion during the prepolymerization is usually 0.001 to 2 MPa, preferably 0.01 to 1 MPa. The prepolymerization time is usually 2 minutes to 15 hours.

The method for producing the ethylene-α-olefin copolymer of the present invention is a method of copolymerizing ethylene with an α-olefin having 3 to 20 carbon atoms using a transition metal compound (A), a transition metal compound (B), a cocatalyst component (C) for activation, and an electron-donating compound as necessary or using the aforementioned prepolymerized solid catalyst component.

Examples of the combination of ethylene with an α-olefin include a combination of ethylene with propylene, a combination of ethylene with 1-butene, a combination of ethylene with 1-hexene, and a combination of ethylene with 1-butene and 1-hexene.

Examples of the polymerization method include a solvent polymerization method or a slurry polymerization method using as a solvent an aliphatic hydrocarbon such as butane, pentane, hexane, heptane, and octane, an aromatic hydrocarbon such as benzene and toluene, or a halogenated hydrocarbon such as methylene dichloride, a vapor phase polymerization method, and a bulk polymerization method. The vapor phase polymerization apparatus to be used for the vapor phase polymerization method is usually an apparatus having a fluidized bed type reaction vessel, preferably an apparatus having a fluidized bed type reaction vessel with an enlarged part. A stirring blade may be mounted in the reaction vessel. Either continuation polymerization or batch type polymerization is available.

The temperature and the time of the polymerization reaction may be determined considering the activity and the used amount of the catalyst, and the desired weight-average molecular weight of a polymer. The polymerization temperature is usually within the range of from −50° C. to 200° C., preferably within the range of from −20° C. to 100° C. The polymerization pressure is preferably normal pressure to 50 MPa. The polymerization time, which is generally determined appropriately depending upon the kind of the target polymer and the reaction apparatus, is usually from 1 minute to 20 hours, preferably from 5 minutes to 18 hours. In order to adjust the molecular weight of a copolymer to be produced, a chain transfer agent such as hydrogen may be added during polymerization.

When a solvent is used for the polymerization reaction, the concentration of each compound in the solvent is not particularly limited. The combined concentration of the transition metal compound (A) and the transition metal compound (B) in a solvent is $1 \times 10^{-8}$ mmol/L to 10 mol/L, for example, and the concentration of the cocatalyst component (C) for activation is $1 \times 10^{-8}$ mmol/L to 10 mol/L, for example. Usually, the volume ratio of the monomer:the solvent is from 100:1 to 1:1000. Also when a monomer is used as a reaction solvent, the concentration can be set appropriately with reference to the above-mentioned range.

When a prepolymerized solid catalyst component is used, as a method of feeding the prepolymerized solid catalyst component into a polymerization reaction vessel, usually used is a method of feeding the prepolymerized solid catalyst component using an inert gas such as nitrogen and argon, hydrogen, ethylene, etc. in a state containing no moisture, or a method of dissolving or diluting the prepolymerized solid catalyst component in a solvent, and feeding it in a solution or slurry state.

To the ethylene-α-olefin copolymer of the present invention may optionally be added an additive. Examples of the additive include antioxidants, weathering agents, lubricants, antiblocking agents, antistatic agents, anticlouding agents, antidripping agent, pigments, and fillers.

The ethylene-α-olefin copolymer of the present invention can be used together with a resin differing from the copolymer. Examples of the resin differing from the ethylene-α-olefin copolymer of the invention include olefin-based resins, such as ethylene-based resins differing from the ethylene-α-olefin copolymer of the present invention and propylene-based resins.

The ethylene-α-olefin copolymer of the present invention is formed by known forming methods, such as a blown film process and a flat die process, a blow molding, an injection molding, and a compression molding into various types of articles (films, sheets, bottles, trays, etc.). As the forming method, a flat die process and a blown film process are suitably used, and articles obtained are used for various applications such as laminate films, films for food packaging, and surface protective films.

EXAMPLES

The present invention is explained by reference to Examples and Comparative Examples below.

The measurement of the physical properties of the copolymers obtained in Examples and Comparative Examples was conducted after kneading the copolymers by the method described below. A proper amount equal to or more than 1000 ppm of an antioxidant such as IRGANOX 1076 was added to a copolymer, followed by kneading with a roll (a test roll Model HR-20F, manufactured by Nissin Chemical Industry Co., Ltd.). The kneading conditions included a front roll temperature 150° C., a back roll temperature 160° C., a roll gap 5 mm, and a kneading time 5 minutes (after sample melting).

(1) Melt Flow Rate (MFR; Unit: g/10 min.)

Measurement was conducted by Method A under conditions represented by a load of 21.18 N and a temperature of 190° C. in accordance with the method provided in JIS K7210-1995.

(2) Density (Unit: $kg/m^3$)

Measurement was conducted in accordance with the method provided in Method A in JIS K7112-1980. Samples were subjected to the annealing disclosed in JIS K6760-1995.

(3) Molecular weight (number average molecular weight (Mn), weight-average molecular weight (Mw), z-average molecular weight (Mz))

Mn, Mw, and Mz of an ethylene-α-olefin copolymer were calculated using the Q factor (17.7) of polyethylene, on the basis of polystyrene-equivalent molecular chain lengths (number average molecular chain length (An), weight average molecular chain length (Aw), and z average molecular chain length (Az)) determined by gel permeation chromatography (GPC) measured under the following conditions.

$Mn = An \times (Q \text{ factor})$ $Mw = Aw \times (Q \text{ factor})$ $Mz = Az \times (Q \text{ factor})$ Instrument: Waters150C manufactured by Waters Corporation
Separation column: TOSOH TSKgel GMH-HT
Measurement temperature: 140° C.
Carrier: orthodichlorobenzene
Flow rate: 1.0 mL/min
Injection amount: 500

(4) Branching Index (g')
g' was calculated using the following formula.

$$g'=[\eta_{br}]/[\eta_l]$$

The intrinsic viscosity ($[\eta_{br}]$) of a sample and the intrinsic viscosity ($[\eta_l]$) of a linear polyethylene that is the same in molecular weight as the sample and has no long chain branches were measured using 3D-GPC under the following conditions.

Instrument: HLC-8120GPC manufactured by TOSOH Corporation
RI Detector: Detector included in HLC-8120GPC manufactured by TOSOH Corporation
Viscosity detector: Viscotek H502
RALLS light scattering detector: Precision Detectors PD2040
Separation column: GMHHR-H(S) HT three columns, produced by TOSOH Corporation
Measurement temperature: 135° C.
Carrier: orthodichlorobenzene (with addition of BHT 0.05 wt %)
Flow rate: 1 mL/min
Injection amount: 300 μL
Sample concentration: 2.0 mg/mL
Analysis software: OmniSEC ver. 4.2

(5) Activation Energy of Flow (Ea, Unit: kJ/Mol)

The activation energy of flow (Ea) was determined by the method described below. Melt complex viscosity-angular frequency curves of an ethylene-α-olefin copolymer at four temperatures (T, unit: ° C.) including 190° C. and three temperatures selected from among 130° C., 150° C., 170° C. and 210° C. were produced. The respective melt complex viscosity-angular frequency curves were superposed onto the melt complex viscosity-angular frequency curve of the ethylene-α-olefin copolymer at 190° C. in accordance with the principle of temperature-time superposition, thereby determining respective shift factors ($a_T$). Subsequently, a linear approximate equation (the following formula (I)) of [ln($a_T$)] and [1/(T+273.16)] was calculated by the least-square method from the respective temperatures (T) and the shift factor ($a_T$) at each temperature (T). Next, Ea was determined from the gradient m of the linear equation and the following formula (II).

$$\ln(a_T)=m(1/(T+273.16))+n \quad (I)$$

$$Ea=|0.008314 \times m| \quad (II)$$

$a_T$: shift factor
Ea: activation energy of flow (unit: kJ/mol)
T: temperature (unit: ° C.)

In the calculation was used Rhios V.4.4.4 produced by Rheometrics.

(6) Swell Ratio (SR)

The swell ratio was calculated via the following method. A strand of an ethylene-α-olefin copolymer extruded in a length of about 15 to about 20 mm through an orifice at a temperature of 190° C. and a load of 21.18 N in the above-described melt flow rate measurement was cooled in the air, whereby a solid strand was obtained. Subsequently, the diameter D (unit: mm) of the strand at a position of about 5 mm away from the extrusion upstream side tip of the strand was measured. A value (D/D$_0$) resulting from dividing the diameter D by the orifice diameter 2.095 mm (D$_0$) was calculated, and that value was defined as the swell ratio.

(7) Number of Long Chain Branches Per 1000 Carbon Atoms (LCB)

LCB was determined by measuring a carbon nuclear magnetic resonance ($^{13}$C-NMR) spectrum of a copolymer according to the following measurement conditions.

(Measurement Conditions)
Instrument: AVANCE600 manufactured by Bruker Corporation
Measurement probe: 10-mm cryoprobe
Measurement solvent: mixed solvent of 1,2-dichlorobenzene/1,2-dichlorobenzene-d$_4$=75/25 (Volumetric Ratio)
Measurement temperature: 130° C.
Measurement method: proton decoupling method
Pulse width: 45 degrees
Pulse repetition time: 4 seconds
Measurement standard: tetramethylsilane
Window function: exponential or Gaussian
Transients: 2,500

(8) Melt Tension (MT, Unit: cN), Maximum Drawing Velocity (MTV, Unit: m/min)

Using a melt tension tester manufactured by Toyo Seiki Seisaku-Sho, Ltd., molten copolymer filled in a 9.55 mmφ barrel was extruded through an orifice 2.09 mmφ in diameter and 8 mm in length at a piston falling rate 5.5 mm/min at a temperature 190° C. The extruded molten copolymer was taken up while increasing the rotation speed at a rate 40 rpm/min by using a take-up roll 50 mmφ in diameter and the tension just before the break of the molten copolymer was measured. The maximum tension during the period from the commencement of drawing to the break of the filament-shaped resin was defined as melt tension (MT), and the drawing velocity at the break was defined as maximum drawing velocity (MTV). A larger value of the melt tension indicates that the melt tension is higher. A resin with a high melt tension is superior in the stability of a bubble in blown film process or the form retentivity of a parison in blow molding and it produces a small neck-in in flat die process. The higher the maximum drawing velocity, the better the drawability in extruding.

(9) Characteristic Relaxation Time (τ, Unit: second)

The characteristic relaxation time τ was measured under the following conditions (a) through (d) by using a strain control type rotational viscometer (rheometer). The characteristic relaxation time is a value calculated from a master curve that is produced in accordance with the principle of temperature-time superposition and indicates the dependence of a melt complex viscosity (unit: Pa·sec) at 190° C. on an angular frequency (unit: rad/sec). Specifically, melt complex viscosity-angular frequency curves at temperatures (T, unit: ° C.) of 130° C., 150° C., 170° C., and 190° C. (the unit of melt complex viscosity is Pa-sec and the unit of angular frequency is rad/sec) of an ethylene-α-olefin copolymer are produced. A master curve is produced by the superposition of melt complex viscosity-angular frequency curves at the respective temperatures other than 190° C. onto the curve at 190° C. in accordance with the principle of temperature-time superposition, and then the resulting master curve is approximated by the following formula to calculate a value, which is a characteristic relaxation time. Measurement was carried out under nitrogen. Rhios V.4.4.4 produced by Reometrics was used as calculation software. There was adopted a value obtained when the correlation coefficient $r^2$ was 0.99 or more in approximating to straight a line in Arrhenius' type plot log $(a_T)$–$(1/T)$.

Condition (a)
  Geometry: parallel plate; diameter: 25 mm, plate distance: 1.5 to 2 mm
Condition (b)
  Strain: 5%
Condition (c)
  Shear rate: 0.1 to 100 rad/sec
Condition (d)
  Temperature: 190, 170, 150, 130° C.

$$\eta = \eta_0/[1+(\tau \times \omega)^n]$$

η: melt complex viscosity (unit: Pa·sec)
ω: angular frequency (unit: rad/sec)
τ: characteristic relaxation time (unit: sec)
$\eta_0$: constant determined for each ethylene-α-olefin copolymer (unit: Pa·sec)
  n: constant determined for each ethylene-α-olefin copolymer The characteristic relaxation time (T) of a copolymer corresponds to the time taken by the polymer chain in the copolymer to relaxes; the slower the relaxation (i.e., the longer the characteristic relaxation time), the more the surface of an article produced using the copolymer is roughened. Therefore, from the viewpoint of obtaining an article with good appearance, it is preferred that the characteristic relaxation time of a copolymer is shorter (see, for example, H. Zhu et. al., Polymer 48, (2007) p. 5098-5106). In order to obtain a high melt tension and a high strain hardening property, a copolymer preferably has a certain prolonged relaxation time. On the other hand, a copolymer having an excessively long relaxation time is high in melting properties but the copolymer will exhibit an impaired drawability when being melted, in other words, the balance between the melt tension and drawability is deteriorated.

(10) Melt Complex Viscosity (η*, Unit: Pa·sec)

In the measurement (9) of a characteristic relaxation time was determined a melt complex viscosity measured at a temperature of 190° C. and an angular frequency of 100 rad/sec. The lower the melt complex viscosity, the better the extrusion load in extruding.

(11) Elongational Viscosity Nonlinear Index k

The elongational viscosity nonlinear index k is a value calculated as a slope of ln α(t) between t=1.5 seconds and t=2.0 seconds for a function α(t)=$\sigma_1$(t)/$\sigma_{0.1}$(t) produced from a viscosity-time curve $\sigma_i$(t) of a copolymer when uniaxially elongated at a temperature of 130° C. and a strain rate of 1 s$^{-1}$ and a viscosity-time curve $\sigma_{0.1}$(t) of the copolymer when uniaxially elongated at a temperature of 130° C. and a strain rate of 0.1 s$^{-1}$. The measurement of a viscosity-time curve σ(t) was performed using ARES produced by TA Instruments. The measurement was performed under a nitrogen atmosphere. The elongational viscosity nonlinear index k serves as an index that indicates the flowability and the processability of a copolymer, and when the elongational viscosity nonlinear index k is small, molding stability and neck-in will deteriorate.

(12) Melt Elongation Ratio ($t_H$)

The melt elongation ratio $t_H$ is an elongation ratio achieved at the occurrence of break of a copolymer during the measurement of a viscosity-time curve $\sigma_1$ (t) when elongating the copolymer uniaxially at a temperature of 130° C. and a strain rate of 1 s$^{-1}$. A copolymer having a large melt elongation ratio $t_H$ is prone to elongate in a molten state.

(13) Tensile Impact Strength (Unit: kJ/m$^2$)

The tensile impact strength of a 2 mm thick sheet prepared by compression molding under the conditions including a molding temperature of 190° C., a preheating time of 10 minutes, a compression time of 5 minutes and a compression pressure of 5 MPa was measured in accordance with ASTM D1822-68. The larger this value, the better the mechanical strength.

Referential Example 1

Method for Producing Modified Particle (I)

Modified particles (I) were produced via the method disclosed in Example 1(1) and (2) in JP-A-2009-79180. Elemental analysis revealed that Zn=11 wt % and F=6.4 wt %.

Referential Example 2

Method for Producing Modified Particle (II)

A 50-L reactor flushed with nitrogen and equipped with a stirrer was charged with 9.68 kg of silica (Sylopol 948 produced by Davison; average particle diameter=55 μm; pore volume=1.67 mL/g; specific surface area=325 m$^2$/g) thermally treated at 300° C. under a nitrogen flow. After the addition of 100 L of toluene, the reactor was cooled to 2° C. To this was dropped 26.3 L of a toluene solution of methylalumoxane (produced by Tosoh Finechem Corporation) (2.9 M) over one hour. After stirring at 5° C. for 30 minutes, the resultant was heated to 95° C. over 90 minutes, followed by stirring for 4 hours. Then, after cooling to 40° C., the resultant was left at rest for 40 minutes, thereby allowing a solid component to settle, and then the top slurry portion was removed. As a washing operation, 100 L of toluene was added thereto, followed by stirring for 10 minutes, and then the stirring was stopped and the mixture was left at rest to allow a solid component to settle, and then the top slurry portion was removed. The above-described washing operation was repeated three times in total. Moreover, 100 L of toluene was added, followed by stirring, and then the stirring was stopped and simultaneously filtration was conducted. After this operation was repeated once more, 110 L of hexane was added, followed by stirring, and then the stirring was stopped and simultaneously filtration was conducted. This operation was repeated once again. Subsequently, drying was conducted at 70° C. for 7 hours under a nitrogen flow, affording 12.6 kg of modified particles (II). Elemental analysis revealed that Al=4.4 mmol/g.

Example 1

An autoclave having an internal volume of 3 liters and equipped with a stirrer, the autoclave having been flushed with argon after drying under reduced pressure, was evacuated, hydrogen was added so that its partial pressure might become about 0.004 MPa, and then 1-hexene (130 mL) and butane (800 g) were fed, and the temperature was raised to 70° C. Ethylene was added so that its partial pressure might become 1.6 MPa, and the system was stabilized. Gas chromatography analysis revealed that the hydrogen concentration of the vapor phase portion was 0.25 mol %. Subsequently, a solution of triisobutylaluminum in hexane (1.5 mL, 1.0 mol/L) was added. To the mixture was added a mixed solution of a solution of dimethylsilylenebis(3-phenylcyclopentadienyl)zirconium dichloride (racemic: meso=1:1) in toluene (1.5 mL, 1.0 mmol/L) and a solution of diphenylmethylene(cyclopentadienyl)(fluorenyl)zirconium dichloride in toluene (0.75 mL, 0.10 mmol/L). Further, 30 mg of the modified particles (I) produced in Referential Example 1 were added as a cocatalyst component for activation, thereby starting polymerization. Polymerization was performed at 70° C. for 1 hour while supplying ethylene so that the total pressure might be kept constant, affording 168 g of an ethylene-1-hexene copolymer. The average hydrogen concentration during the polymerization was 0.16 mol %. The activity per gram of the cocatalyst component for activation was 5700 g/g/h. Physical properties of the resulting copolymer are shown in Table 1.

Example 2

An ethylene-1-hexene copolymer (131 g) was obtained by copolymerizing ethylene with 1-hexene in the same way as in Example 1 except for adjusting the hydrogen partial pressure to 0.008 MPa (the hydrogen concentration to 0.47%) and using 28 mg of the modified particles (I). The average hydrogen concentration during the polymerization was 0.16 mol %. The activity per gram of the cocatalyst component for activation was 4700 g/g/h. Physical properties of the resulting copolymer are shown in Table 1.

Example 3

An autoclave having an internal volume of 5 liters and equipped with a stirrer, the autoclave having been flushed with argon after drying under reduced pressure, was evacuated, hydrogen was added so that its partial pressure might become about 0.009 MPa, and then 1-hexene (220 mL) and butane (1350 g) were fed, and the temperature was raised to 70° C. Ethylene was added so that its partial pressure might become 1.6 MPa, and the system was stabilized. Gas chromatography analysis revealed that the hydrogen concentration of the vapor phase portion was 0.48 mol %. Subsequently, a solution of triisobutylaluminum in hexane (2.0 mL, 1.0 mol/L) was added. To the mixture was added a mixed solution of a solution of dimethylsilylenebis(3-phenylcyclopentadienyl)zirconium dichloride (racemic:meso=1:1) in toluene (2.5 mL, 1.0 mmol/L) and a solution of diphenylmethylene(cyclopentadienyl) (fluorenyl)zirconium dichloride in toluene (0.13 mL, 0.10 mmol/L). Further, 52 mg of the modified particles (I) produced in Referential Example 1 were added as a cocatalyst component for activation, thereby starting polymerization. Polymerization was performed at 70° C. for 2 hours while supplying ethylene so that the total pressure might be kept constant, affording 274 g of an ethylene-1-hexene copolymer. The average hydrogen concentration during the polymerization was 0.43 mol %. The activity per gram of the cocatalyst component for activation was 2600 g/g/h. Structural values and physical properties of the resulting copolymer are shown in Table 1.

Comparative Example 1

An autoclave having an internal volume of 3 liters and equipped with a stirrer, the autoclave having been flushed with argon after drying under reduced pressure, was evacuated, hydrogen was added so that its partial pressure might become about 0.03 MPa, and then 1-hexene (180 mL) and butane (650 g) were fed, and the temperature was raised to 70° C. Ethylene was added so that its partial pressure might become 1.6 MPa, and the system was stabilized. Gas chromatography analysis revealed that the hydrogen concentration of the vapor phase portion was 1.8 mol %. Subsequently, a solution of triisobutylaluminum in hexane (0.9 mL, 1 mol/L) was added. To the mixture was added a mixed solution of a solution of dimethylsilylenebis(cyclopentadienyl)zirconium dichloride in toluene (6.3 mL, 2.0 mmol/L) and a solution of diphenylmethylene(cyclopentadienyl) (fluorenyl)zirconium dichloride in toluene (0.50 mL, 1.0 mmol/L). Further, 53 mg of the modified particles (I) produced in Referential Example 1 were added as a cocatalyst component for activation, thereby starting polymerization. Polymerization was performed at 70° C. for 1 hour while supplying an ethylene/hydrogen mixed gas (hydrogen concentration: 0.19 mol %) so that the total pressure might be kept constant, affording 58 g of an ethylene-1-hexene copolymer. The average hydrogen concentration during the polymerization was 1.8 mol %. The activity per gram of the cocatalyst component for activation was 1100 g/g/h. Physical properties of the resulting copolymer are shown in Table 1.

Comparative Example 2

An ethylene-1-hexene copolymer (82 g) was obtained by copolymerizing ethylene with 1-hexene in the same way as in Comparative Example 1 except for adjusting the hydrogen partial pressure to 0.02 MPa (the hydrogen concentration to 1.2%), using 48 mg of the modified particles (I), and adjusting the hydrogen concentration of the ethylene/hydrogen mixed gas supplied during the polymerization to 0.11 mol %. The average hydrogen concentration during the polymerization was 1.2 mol %. The activity per gram of the cocatalyst component for activation was 1700 g/g/h. Physical properties of the resulting copolymer are shown in Table 1.

Comparative Example 3

An autoclave having an internal volume of 3 liters and equipped with a stirrer, the autoclave having been flushed with argon after drying under reduced pressure, was evacuated, hydrogen was added so that its partial pressure might become about 0.004 MPa, and then 1-hexene (180 mL) and butane (650 g) were fed, and the temperature was raised to 70° C. Ethylene was added so that its partial pressure might become 1.6 MPa, and the system was stabilized. Gas chromatography analysis revealed that the hydrogen concentration of the vapor phase portion was 0.26 mol %. Subsequently, a solution of triisobutylaluminum in hexane (0.9 mL, 1 mol/L) was added. To the mixture was added a mixed solution of a solution of dimethylsilylenebis(cyclopentadienyl)zirconium dichloride in toluene (5.0 mL, 5.0 mmol/L) and a solution of diphenylmethylene(cyclopentadienyl) (fluorenyl)zirconium dichloride in toluene (0.50 mL, 1 mmol/L). Further, 281 mg of the modified particles (II) produced in Referential Example 2 were added as a cocatalyst component for activation, thereby starting polymerization. Polymerization was performed at 70° C. for 1.5 hours while supplying ethylene so that the total pressure might be kept constant, affording 161 g of an ethylene-1-hexene copolymer. The average hydrogen concentration during the polymerization was 0.26 mol %. The activity per gram of the cocatalyst component for activation was 380 g/g/h. Physical properties of the resulting copolymer are shown in Table 1.

Comparative Example 4

An autoclave having an internal volume of 3 liters and equipped with a stirrer, the autoclave having been flushed with argon after drying under reduced pressure, was evacuated, 1-hexene (160 mL) and butane (1000 g) were fed, and the temperature was raised to 80° C. Ethylene was added so that its partial pressure might become 1.6 MPa, and the system was stabilized. Subsequently, a solution of triisobutylaluminum in hexane (2.0 mL, 1 mol/L) was added. To the mixture was added a solution of dimethylsilylenebis(3-phenylcyclopentadienyl)zirconium dichloride (racemic meso=1:1) in toluene (1.5 mL, 1.0 mmol/L). Further, 34 mg of the modified particles (I) produced in Referential Example 1 were added as a cocatalyst component for activation, thereby starting polymerization.

Polymerization was performed at 80° C. for 2.5 hours while supplying ethylene so that the total pressure might be kept constant, affording 319 g of an ethylene-1-hexene copolymer. The activity per gram of the cocatalyst component for activation was 3800 g/g/h. Physical properties of the resulting copolymer are shown in Table 1.

Comparative Example 5

An autoclave having an internal volume of 3 liters and equipped with a stirrer, the autoclave having been flushed with argon after drying under reduced pressure, was evacuated, hydrogen was added so that its partial pressure might become about 0.004 MPa, and then 1-hexene (100 mL) and butane (650 g) were fed, and the temperature was raised to 70° C. Ethylene was added so that its partial pressure might become 1.6 MPa, and the system was stabilized. Gas chromatography analysis revealed that the hydrogen concentration of the vapor phase portion was 0.24 mol %. Subsequently, a solution of triisobutylaluminum in hexane (0.90 mL, 1.0 mol/L) was added. To the mixture was added a solution of dimethylsilylenebis(3-phenylcyclopentadienyl)zirconium dichloride (racemic meso=1:1) in toluene (1.0 mL, 1.0 mmol/L). Further, 6 mg of the modified particles (I) produced in Referential Example 1 were added as a cocatalyst component for activation, thereby starting polymerization.

Polymerization was performed at 70° C. for 1 hour while supplying ethylene so that the total pressure might be kept constant, affording 33 g of an ethylene-1-hexene copolymer. The average hydrogen concentration during the polymerization was 0.27 mol %. The activity per gram of the cocatalyst component for activation was 5400 g/g/h. Physical properties of the resulting copolymer are shown in Table 1.

Comparative Example 6

An autoclave having an internal volume of 3 liters and equipped with a stirrer, the autoclave having been flushed with argon after drying under reduced pressure, was evacuated, hydrogen was added so that its partial pressure might become about 0.008 MPa, and then 1-hexene (130 mL) and butane (800 g) were fed, and the temperature was raised to 70° C. Ethylene was added so that its partial pressure might become 1.6 MPa, and the system was stabilized. Gas chromatography analysis revealed that the hydrogen concentration of the vapor phase portion was 0.51 mol %. Subsequently, a solution of triisobutylaluminum in hexane (1.5 mL, 1.0 mol/L) was added. To the mixture was added a solution of diphenylmethylene(cyclopentadienyl) (fluorenyl)zirconium dichloride in toluene (0.50 mL, 0.50 mmol/L). Further, 31 mg of the modified particles (I) produced in Referential Example 1 were added as a cocatalyst component for activation, thereby starting polymerization. Polymerization was performed at 70° C. for 0.5 hours while supplying ethylene so that the total pressure might be kept constant, affording 56 g of an ethylene-1-hexene copolymer. The average hydrogen concentration during the polymerization was 0.57 mol %. The activity per gram of the cocatalyst component for activation was 3500 g/g/h. Physical properties of the resulting copolymer are shown in Table 1.

Comparative Example 7

An autoclave having an internal volume of 3 liters and equipped with a stirrer, the autoclave having been flushed with argon after drying under reduced pressure, was evacuated, hydrogen was added so that its partial pressure might become about 0.009 MPa, and then 1-hexene (100 mL) and butane (650 g) were fed, and the temperature was raised to 70° C. Ethylene was added so that its partial pressure might become 1.6 MPa, and the system was stabilized. Gas chromatography analysis revealed that the hydrogen concentration of the vapor phase portion was 0.42 mol %. Subsequently, a solution of triisobutylaluminum in hexane (0.90 mL, 1.0 mol/L) was added.

To the mixture was added a solution of dimethylsilylenebis(3-phenylcyclopentadienyl)zirconium dichloride (racemic:meso=1:1) in toluene (1.0 mL, 1.0 mmol/L). Further, 10 mg of the modified particles (I) produced in Referential Example 1 were added as a cocatalyst component for activation, thereby starting polymerization.

Polymerization was performed at 70° C. for 0.5 hours while supplying ethylene so that the total pressure might be kept constant, affording 54 g of an ethylene-1-hexene copolymer. The average hydrogen concentration during the polymerization was 0.45 mol %. The activity per gram of the cocatalyst component for activation was 5200 g/g/h. This copolymer and the copolymer obtained in Comparative Example 6 were mixed in a weight ratio of 80/20, followed by roll kneading under the conditions shown previously. When the resulting composition was pressed to form a sheet, many seeds were generated in the sheet. This proves that it is difficult to mix these copolymers uniformly.

TABLE 1

| | Example 1 | Example 2 | Example 3 | Comparative Example 1 | Comparative Example 2 |
|---|---|---|---|---|---|
| MFR (g/10 min) | 2.04 | 7.70 | 2.87 | 4.18 | 0.66 |
| Density (kg/m$^3$) | 923.8 | 924.4 | 923.2 | 928.4 | 925.6 |
| Mw/Mn | 6.2 | 6.5 | 5.4 | 11 | 13 |
| Mz/Mw | 4.1 | 5.6 | 3.5 | 7.7 | 6.7 |
| Branching-index g' at a molecular weight of $10^{6.5}$ g/mol | 0.29 | 0.35 | 0.32 | | |
| Ea (kJ/mol) | 75.5 | 71.9 | 70.2 | 53.9 | 51.4 |

TABLE 1-continued

| | | | | | |
|---|---|---|---|---|---|
| LCB (branches/1000 carbon atoms) | 0.29 | 0.24 | 0.25 | 0.14 | 0.10 |
| SR | 2.8 | — | 2.7 | 2.1 | 1.7 |
| MT (cN) | 24.5 | 10.5 | 19.1 | 8.7 | 15.9 |
| MTV (m/min) | 8.31 | 11.8 | 8.17 | 10.0 | 8.7 |
| Characteristic relaxation time (sec) | 2.8 | 2.7 | 2.4 | 15 | 43 |
| Melt complex viscosity (Pa · sec) | 324 | 180 | 315 | 208 | 346 |
| Elongational viscosity nonlinear index k | 1.28 | 1.39 | 1.17 | 0.77 | 0.81 |
| Melt elongation ratio $t_H$ | 3.7 | 4.2 | 3.5 | 4.1 | 3.7 |
| Tensile impact strength (kJ/m$^2$) | 303 | 156 | 310 | 173 | 432 |

| | Comparative Example 3 | Comparative Example 4 | Comparative Example 5 | Comparative Example 6 |
|---|---|---|---|---|
| MFR (g/10 min) | 3.86 | 9.85 | 3.65 | <0.01 |
| Density (kg/m$^3$) | 922.8 | 922.5 | 922.0 | 899.0 |
| Mw/Mn | 11 | 4.4 | 5.4 | 2.5 |
| Mz/Mw | 6.9 | 3.0 | 3.1 | 2.2 |
| Branching-index g' at a molecular weight of $10^{6.5}$ g/mol | 0.50 | | 0.25 | |
| Ea (kJ/mol) | 99.7 | 61.0 | 59.3 | 39.0 |
| LCB (branches/1000 carbon atoms) | 0.12 | 0.33 | 0.34 | below the detection limit |
| SR | 2.5 | 1.9 | 1.8 | |
| MT (cN) | 15.0 | 1.5 | 4.0 | |
| MTV (m/min) | 3.0 | 28.5 | 13.2 | |
| Characteristic relaxation time (sec) | 53 | 0.38 | 1.2 | 10 |
| Melt complex viscosity (Pa · sec) | 182 | 287 | 414 | |
| Elongational viscosity nonlinear index k | 1.34 | 0.68 | 0.61 | Strain hardening property is not exhibited. |
| Melt elongation ratio $t_H$ | 4.3 | 4.4 | 2.7 | |
| Tensile impact strength (kJ/m$^2$) | 238 | 250 | 328 | |

(Flat Die Process)

A flat die cast film apparatus was used in which a 15 mmϕ single screw extruder manufactured by Randcastle equipped with a flat die (straight manifold) having a width of 150 mm, a cooling roll produced by Randcastle, and a winding machine were mounted. At a temperature of 300° C. and an air gap of 40 mm, a monolayer film was produced using a copolymer obtained in Example. The neck-in and the drawability of a film were evaluated during producing the film. In the measurement of neck-in, the neck-in was calculated as the difference ($L_0$–L) between the width of the flat die ($L_0$) and the width of the film (L) measured at a drawing velocity of 3.5 m/min and a film thickness of 20 μm. The smaller the neck-in, the better the processability is. The drawability of a film was evaluated as an extrusion rate (g/hr) at which a film was broken. A film is produced during reducing an extrusion rate with the drawing velocity kept constant (8.9 m/min) until the film is broken. The smaller the extrusion rate, the better the drawability is. The results are shown in Table 2.

TABLE 2

| | | Example 3 | Comparative Example 3 | Comparative Example 4 | High pressure process LDPE[1] |
|---|---|---|---|---|---|
| Neck-in | mm | 23 | 16 | 36 | 19 |
| Drawability | Extrusion rate (g/hr) | 116 | 520 | 95 | 148 |

[1]SUMIKATHENE ™ L705 produced by Sumitomo Chemical Co., Ltd.

The invention claimed is:

1. An ethylene-α-olefin copolymer comprising monomer units derived from ethylene and monomer units derived from an α-olefin having 3 to 20 carbon atoms, the ethylene-α-olefin copolymer satisfying the following requirements (A) to (E):
   (A) the melt flow rate is 0.1 to 50 g/10 min., wherein the melt flow rate is determined at a temperature of 190° C.

and a load of 21.18 N in accordance with Method A provided in JIS K7210-1995, (B) the density is 860 to 970 kg/m³, (C) the ratio of the z-average molecular weight to the weight-average molecular weight is from 3.0 to 6.0, (D) the fraction of molecules of the ethylene-α-olefin copolymer having a molecular weight of $10^{6.5}$ g/mol has a branching index g' of 0.26 or more, wherein the molecular weight is determined by 3D-GPC, and (E) the activation energy of flow is 60 to 90 kJ/mol.

2. The ethylene-α-olefin copolymer according to claim 1, the ethylene-α-olefin copolymer satisfying the following requirement (F):

(F) the swell ratio is from 2.4 to 4.0.

3. The ethylene-α-olefin copolymer according to claim 1, the ethylene-α-olefin copolymer satisfying the following requirement (G):

(G) the number of long chain branches per 1000 carbon atoms constituting the ethylene-α-olefin copolymer is 0.20 or more.

4. A resin composition comprising the ethylene-α-olefin copolymer according to claim 1.

5. An article made of the resin composition according to claim 4.

* * * * *